United States Patent
Yokoya et al.

(10) Patent No.: US 10,535,337 B2
(45) Date of Patent: Jan. 14, 2020

(54) METHOD FOR CORRECTING FALSE RECOGNITION CONTAINED IN RECOGNITION RESULT OF SPEECH OF USER

(71) Applicant: Panasonic Intellectual Property Management Co., Ltd., Osaka (JP)

(72) Inventors: Mayu Yokoya, Tokyo (JP); Katsuyoshi Yamagami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 15/448,688

(22) Filed: Mar. 3, 2017

(65) Prior Publication Data

US 2017/0270909 A1 Sep. 21, 2017

(30) Foreign Application Priority Data

Mar. 15, 2016 (JP) .................. 2016-050652

(51) Int. Cl.
*G10L 15/01* (2013.01)
*G10L 15/18* (2013.01)
*G10L 15/22* (2006.01)
*G10L 15/26* (2006.01)
*G10L 15/08* (2006.01)

(52) U.S. Cl.
CPC .......... *G10L 15/01* (2013.01); *G10L 15/1822* (2013.01); *G10L 15/22* (2013.01); *G10L 15/26* (2013.01); *G10L 15/1815* (2013.01); *G10L 2015/088* (2013.01); *G10L 2015/223* (2013.01); *G10L 2015/228* (2013.01)

(58) Field of Classification Search
CPC ... G10L 2015/088; G10L 15/01; G10L 15/26; G10L 15/1822
See application file for complete search history.

(56) References Cited

U.S. PATENT DOCUMENTS 5,799,273 A * 8/1998 Mitchell ................ G06F 3/16
704/235
6,064,959 A * 5/2000 Young ................ G10L 15/063
704/251

(Continued)

FOREIGN PATENT DOCUMENTS

JP 2003-140691 5/2003
JP 2004-086150 A 3/2004

(Continued)

OTHER PUBLICATIONS

The Extended European Search Report, dated Jul. 21, 2017 from the European Patent Office (EPO), for the related European Patent Application No. 17160745.0.

*Primary Examiner* — Eric Yen
(74) *Attorney, Agent, or Firm* — Greenblum & Bernstein, P.L.C.

(57) ABSTRACT

A method includes determining a content of a speech of a user on the basis of text data including a word string acquired as a recognition result of the speech, selecting a correction method suitable for the determined content of the speech from among multiple correction methods for correcting false recognition contained in the text data, and correcting the false recognition contained in the text data using the selected correction method.

17 Claims, 19 Drawing Sheets

| SPEECH CONTENT ID | FALSE RECOGNITION CORRECTION METHOD ID |
|---|---|
| C001 | RID001 |
| C002 | RID003 |
| C003 | RID002 |
| C004 | RID002 |
| C005 | RID002, RID003 |
| ... | ... |

(56) References Cited

U.S. PATENT DOCUMENTS

| | | | | |
|---|---|---|---|---|
| 6,122,612 | A * | 9/2000 | Goldberg | G10L 15/08 704/231 |
| 6,629,074 | B1 * | 9/2003 | Tannenbaum | G10L 15/28 704/270 |
| 6,728,676 | B1 * | 4/2004 | Ortega | G06Q 20/203 704/231 |
| 7,200,555 | B1 * | 4/2007 | Ballard | G10L 15/22 704/235 |
| 9,190,054 | B1 * | 11/2015 | Riley | G10L 25/48 |
| 2002/0111806 | A1 * | 8/2002 | Franz | G10L 15/18 704/255 |
| 2004/0019482 | A1 * | 1/2004 | Holub | G06Q 50/24 704/231 |
| 2004/0030560 | A1 | 2/2004 | Takami et al. | |
| 2007/0073540 | A1 | 3/2007 | Hirakawa et al. | |
| 2007/0260456 | A1 * | 11/2007 | Proux | H04M 1/72552 704/235 |
| 2007/0271086 | A1 | 11/2007 | Peters et al. | |
| 2008/0040111 | A1 * | 2/2008 | Miyamoto | G10L 15/22 704/240 |
| 2008/0077406 | A1 * | 3/2008 | Ganong, III | G10L 15/22 704/251 |
| 2009/0228273 | A1 * | 9/2009 | Wang | G06F 3/04883 704/235 |
| 2009/0326938 | A1 * | 12/2009 | Marila | G10L 15/22 704/235 |
| 2012/0245936 | A1 * | 9/2012 | Treglia | G06F 17/289 704/235 |
| 2013/0246048 | A1 * | 9/2013 | Nagase | G06F 17/2223 704/9 |
| 2014/0122069 | A1 * | 5/2014 | Bravin | G10L 15/183 704/235 |
| 2014/0281944 | A1 * | 9/2014 | Winer | G06F 17/2735 715/259 |
| 2015/0127325 | A1 * | 5/2015 | Birnbaum | G06F 17/271 704/9 |
| 2015/0373082 | A1 * | 12/2015 | Liu | H04L 67/02 709/203 |
| 2018/0166079 | A1 * | 6/2018 | Skobeltsyn | G06F 17/271 |

FOREIGN PATENT DOCUMENTS

| | | |
|---|---|---|
| JP | 2004-264464 A | 9/2004 |
| JP | 2010-256498 | 11/2010 |
| JP | 2011-186491 A | 9/2011 |

* cited by examiner

FIG. 5

| SPEECH RECOGNITION RESULT | INPUT SPEECH | SPEECH CONTENT ID |
|---|---|---|
| TURN ON THE TV | TURN ON THE TV | C001 |
| DOOR ON THE TV | POWER ON THE TV | C002 |
| POOR ON THE TV | POWER ON THE TV | C002 |
| INCREASE THE TV VALUE BY ONE LEVEL | INCREASE THE TV VOLUME BY ONE LEVEL | C003 |
| CHANNEL 8 | CHANNEL 8 | C004 |
| . . . | . . . | . . . |
| GOOD MORNING | GOOD MORNING | C999 |
| GOOD NIGHT | GOOD NIGHT | C999 |
| . . . | . . . | . . . |

FIG. 6

| SPEECH CONTENT ID | SPEECH CONTENT | TYPE OF DEVICE TO BE CONTROLLED | TYPE OF DEVICE CONTROL | FREQUENTLY FALSELY RECOGNIZED WORD |
|---|---|---|---|---|
| C001 | DEVICE CONTROL | TV | POWER ON/OFF | ON, OFF |
| C002 | DEVICE CONTROL | TV | POWER ON/OFF | |
| C003 | DEVICE CONTROL | TV | VOLUME CONTROL | NUMBER |
| C004 | DEVICE CONTROL | TV | CHANNEL CHANGE | NUMBER |
| ⋮ | ⋮ | ⋮ | ⋮ | ⋮ |
| C999 | SMALL TALK | — | — | — |
| ⋮ | ⋮ | ⋮ | ⋮ | ⋮ |

FIG. 7

| SPEECH CONTENT ID | FALSE RECOGNITION CORRECTION METHOD ID |
|---|---|
| C001 | RID001 |
| C002 | RID003 |
| C003 | RID002 |
| C004 | RID002 |
| C005 | RID002, RID003 |
| ... | ... |

FIG. 8

| FALSE RECOGNITION CORRECTION METHOD ID | FALSE RECOGNITION CORRECTION METHOD | INPUT DATA |
|---|---|---|
| RID001 | SIMILAR-PHONEME FALSE RECOGNITION CORRECTION METHOD | SPEECH FEATURE VALUE |
| RID002 | PARAMETER-SPECIALIZED FALSE RECOGNITION CORRECTION METHOD | SPEECH RECOGNITION RESULT, SPEECH FEATURE VALUE |
| RID003 | CONTEXT-DEPENDENT FALSE RECOGNITION CORRECTION METHOD | SPEECH RECOGNITION RESULT |
| ... | ... | ... |

FIG. 9

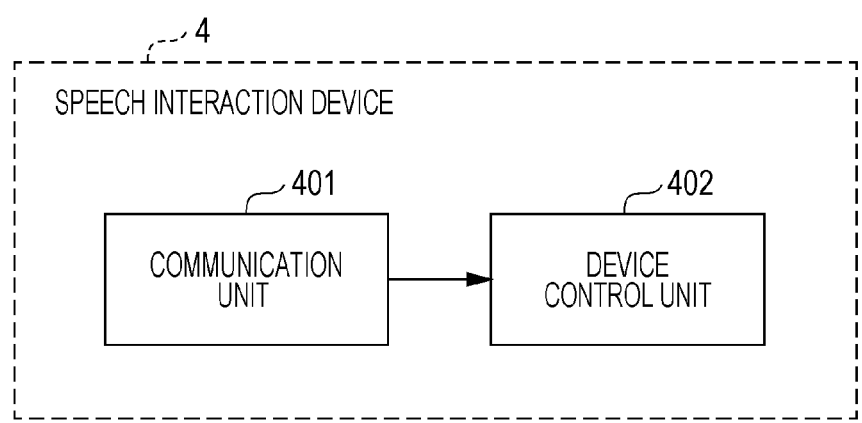

FIG. 14

| SPEECH RECOGNITION RESULT OR FALSE RECOGNITION CORRECTION RESULT | DEVICE CONTROL ID |
|---|---|
| TURN ON THE TV | M001 |
| POWER ON THE TV | M001 |
| PLEASE POWER ON THE TV | M001 |
| INCREASE THE TV VOLUME BY ONE LEVEL | M002 |
| CHANNEL 8 | M003 |
| . . . | . . . |
| GOOD MORNING | M999 |
| GOOD NIGHT | M1000 |
| . . . | . . . |

FIG. 15

| DEVICE CONTROL ID | CONTROL TYPE | TYPE OF DEVICE TO BE CONTROLLED | TYPE OF DEVICE CONTROL |
|---|---|---|---|
| M001 | DEVICE CONTROL | TV | POWER ON/OFF |
| M002 | DEVICE CONTROL | TV | VOLUME CONTROL |
| M003 | DEVICE CONTROL | TV | CHANNEL CHANGE |
| ... | ... | ... | ... |
| M999 | SMALL TALK | SMARTPHONE | RESPONSE "GOOD MORNING" |
| M1000 | SMALL TALK | SMARTPHONE | RESPONSE "GOOD NIGHT" |
| ... | ... | ... | ... |

METHOD FOR CORRECTING FALSE RECOGNITION CONTAINED IN RECOGNITION RESULT OF SPEECH OF USER

BACKGROUND

1. Technical Field

The present disclosure relates to a method, device, and program for correcting false recognition contained in the recognition result of a speech of the user.

2. Description of the Related Art

A speech recognition technology is a technology that converts a speech into a character string. Speech interaction devices that control a device on the basis of a speech using a speech recognition technology are being considered.

When a speech is converted into a character string using a speech recognition technology, the recognition result of the speech may contain false recognition. For example, a speech "power on the TV" uttered by the user may be recognized as "poor on the TV." If a speech for controlling a device is falsely recognized as described above, the device would not operate as intended by the user.

To more accurately control a device on the basis of a speech uttered by the user, there are technologies that reduce the incidence of false recognition by adapting the speech recognition function to expressions or words that are more likely to be uttered, on the basis of character strings that the user is assumed to utter. Examples of technologies that automatically adapt the speech recognition function to such expressions or words include Japanese Unexamined Patent Application Publication Nos. 2003-140691 and 2010-256498.

SUMMARY

However, there has been a demand to further improve these conventional technologies.

In one general aspect, the techniques disclosed here feature a method including determining a content of a speech of a user on the basis of text data including a word string acquired as a recognition result of the speech, selecting a correction method suitable for the determined content of the speech from among multiple correction methods for correcting false recognition contained in the text data, and correcting the false recognition contained in the text data using the selected correction method.

It should be noted that general or specific embodiments may be implemented as a system, a method, an integrated circuit, a computer program, a storage medium, or any selective combination thereof.

According to the present disclosure, the false recognition contained in the speech recognition result can be reduced.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram showing an example of speech content ID determination data for determining a speech content ID on the basis of a speech recognition result;

FIG. 6 is a diagram showing an example of speech content ID data describing details of speech content IDs;

FIG. 7 is a diagram showing an example of false recognition correction method ID selection data for selecting a false recognition correction method ID on the basis of a speech content ID;

FIG. 8 is a diagram showing an example of false recognition correction method ID data describing details of false recognition correction method IDs;

FIG. 9 is a block diagram showing a specific configuration of a speech interaction device according to the first embodiment of the present disclosure;

FIG. 14 is a diagram showing an example of device control ID determination data for determining a device control ID on the basis of a speech recognition result or false recognition correction result;

FIG. 15 is a diagram showing an example of device control ID data describing details of device control IDs;

DETAILED DESCRIPTION

Figure 1:
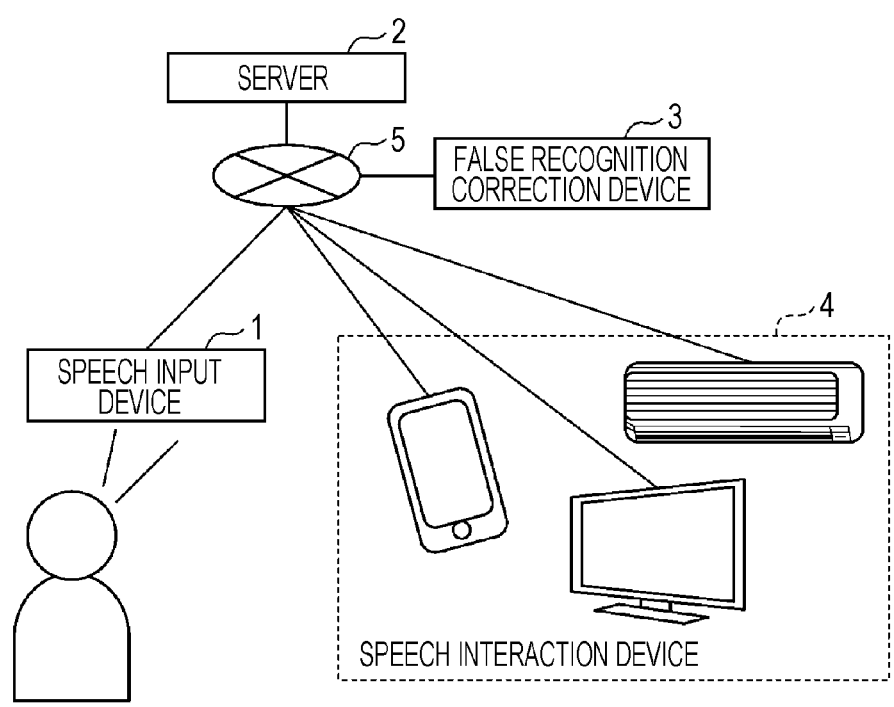
FIG. 1 is a diagram showing an overall configuration of a speech control system according to a first embodiment of the present disclosure.

Underlying Knowledge Forming Basis of the Present Disclosure

Patent Literature 1 described above discloses a speech using system that recognizes a speech of the user in accordance with the content of the speech and reduces false recognition by selecting one of multiple speech recognition engines or combining multiple speech recognition engines on the basis of information for predicting the content of the speech. For example, when a terminal device notifies the user that "tell a four-digit device PIN," the speech using system predicts that the subsequent speech of the user will contain numbers and reduces the false recognition of numbers by using a speech recognition engine having a high number recognition rate.

Patent Literature 2 describes a speech recognition result conversion system that generates conversion models corresponding to multiple applications determined accordance with purposes with which speech recognition results are converted and obtains text subjected to conversion processes corresponding to the applications by using the generated conversion models.

As seen above, in order to recognize a speech of the user in accordance with the content of the speech, both Patent Literatures 1 and 2 must predict the content of the speech before recognizing the speech. For this reason, these Patent Literatures have a problem that if it is difficult to obtain information for predicting the content of the speech of the user, they cannot recognize the speech in accordance with the content of the speech and therefore cannot reduce false recognition.

For example, when Patent Literatures 1 and 2 control a TV by recognizing a speech, they have no information for predicting an operation (e.g., a volume operation, channel operation, or program search operation) that the user will perform next, unless the user is operating the TV. For this reason, these Patent Literatures cannot recognize the speech in accordance with the content of the speech and therefore cannot reduce false recognition. The present inventors have conceived of aspects of the present disclosure on the basis of the above consideration.

A method of one aspect of the present disclosure is a method including determining a content of a speech of a user on the basis of text data including a word string acquired as a recognition result of the speech, selecting a correction method suitable for the determined content of the speech from among multiple correction methods for correcting false recognition contained in the text data, and correcting the false recognition contained in the text data using the selected correction method.

Thus, the false recognition contained in the speech recognition result can be reduced without having to previously obtain information for predicting the content of the speech of the user.

In the method, the correction methods may include at least one of (i) a first correction method that converts a word whose false recognition is to be corrected into one of multiple words having similar phonemes, (ii) a second correction method that converts a word whose false recognition is to be corrected into a word relating to a parameter, of multiple words having similar phonemes, and (iii) a third correction method that converts a word whose false recognition is to be corrected into another word corresponding to a context.

Thus, the false recognition contained in the text data can be corrected using at least one of the correction methods (i), (ii), and (iii) selected in accordance with the content of the speech.

In the method, the selecting may include selecting the correction method suitable for the determined content of the speech with reference to a table in which first information identifying contents of speeches and second information identifying the correction methods are associated with each other.

Thus, the correction method suitable for the content of the speech can be easily selected.

The method may further include acquiring a current situation of a device operated by a speech of the user, and the determining may include determining the content of the speech on the basis of a prediction based on the acquired current situation of the device.

Thus, a correction method suitable for the more accurate content of the speech can be selected.

The method may further include determining whether false recognition needs to be corrected, on the basis of the determined content of the speech, and the selecting may include, if it is determined that false recognition needs to be corrected, selecting the correction method suitable for the determined content of the speech from among the correction methods and, if it is determined that false recognition does not need to be corrected, not selecting the correction method suitable for the determined content of the speech from among the correction methods.

Thus, a correction method suitable for the content of the speech is selected only when false recognition needs to be corrected. As a result, the performance of an unnecessary selection process can be prevented.

In the method, the determining may include, if the content of the speech relates to control of a device operated by a speech of the user, determining that false recognition needs to be corrected.

If the recognition result of an input speech for controlling a device contains false recognition, the operability of the device may deteriorate. For this reason, if the content of the speech relates to the control of the device, the false recognition is corrected. Thus, it is possible to accurately control the device and to reliably operate the device.

In the method, the determining may include, if the content of the speech relates to small talk, determining that false recognition does not need to be corrected.

If the content of the speech is small talk and even if the speech recognition result contains false recognition, the control of the device would not be affected. For this reason, if the content of the speech is small talk, a process of correcting false recognition is not performed. Thus, the performance of an unnecessary process can be prevented.

In the method, the determining may include, if the text data contains a character string which is falsely recognized at a higher frequency than a predetermined value, determining that false recognition needs to be corrected.

Thus, if the text data contains a character string which is falsely recognized at a higher frequency than a predetermined value, false recognition can be reliably corrected.

In the method, the character string which is falsely recognized with the higher frequency than the predetermined value may be a parameter used to operate a device operated by a speech of the user.

A parameter used to operate a device operated by a speech of the user is more likely to be falsely recognized. Accordingly, if the text data contains such a parameter, false recognition can be reliably corrected.

In the method, the parameter may be a number.

A number is more likely to be falsely recognized. Accordingly, if the text data contains a number, false recognition can be reliably corrected.

In the method, the word string which is falsely recognized with the higher frequency than the predetermined value may be a word string having a phoneme similar to a phoneme of a previously stored word string.

A word string having a phoneme similar to a phoneme of a previously stored word string is more likely to be falsely recognized. Accordingly, if the text data contains a word string having a phoneme similar to a phoneme of a previously stored word string, false recognition can be reliably corrected.

In the method, the correcting may include correcting the false recognition contained in the text data using at least one of the recognition result and a feature value of the speech in accordance with the selected correction method.

The method may further include notifying the user of at least one of the text data acquired as the recognition result and the false recognition-corrected text data.

Thus, the user can check whether the speech has been recognized properly.

The method may further include preliminarily correcting the false recognition contained in the text data using a predetermined preliminary correction method, and the determining may include determining the content of the speech on the basis of the preliminarily corrected text data.

Thus, first, the false recognition contained in the text data is preliminarily corrected using the predetermined preliminary correction method and then false recognition contained in the preliminarily false recognition corrected text data is corrected again using the correction method selected in accordance with the content of the speech. That is, the false recognition contained in the speech recognition result is corrected at least twice. As a result, the false recognition contained in the speech recognition result can be reduced more reliably.

In the method, the preliminarily correcting may include preliminarily correcting a word whose false recognition occurs at a higher frequency than a predetermined value, of words contained in the text data.

A device of another aspect of the present disclosure includes one or more memories; and circuitry which, in operation, determines a content of a speech of a user on the basis of text data including a word string acquired as a recognition result of the speech, selects a correction method suitable for the determined content of the speech from among multiple correction methods for correcting false recognition contained in the text data, and corrects the false recognition contained in the text data using the selected correction method.

Thus, the false recognition contained in the speech recognition result can be reduced without having to previously obtain information for predicting the content of the speech of the user.

A computer-readable non-transitory storage medium of yet another aspect of the present disclosure is a computer-readable non-transitory storage medium storing a program that when executed by a computer, causes the computer to perform a method including determining a content of a speech of a user on the basis of text data including a word string acquired as a recognition result of the speech, selecting a correction method suitable for the determined content of the speech from among multiple correction methods for correcting false recognition contained in the text data, and correcting the false recognition contained in the text data using the selected correction method.

Thus, the false recognition contained in the speech recognition result can be reduced without having to previously obtain information for predicting the content of the speech of the user.

Now, embodiments of the present disclosure will be described with reference to the drawings.

It should be noted that the embodiments below are only illustrative of the present disclosure. The numbers, shapes, elements, steps, the order of the steps, and the like described in the embodiments are only illustrative and are not intended to limit the present disclosure. Of the elements of the embodiments, elements which are not set forth in the independent claims, which represent the highest concepts, are described as optional elements. The descriptions of the embodiments can be combined.

First Embodiment

FIG. 1 is a diagram showing an overall configuration of a speech control system according to a first embodiment of the present disclosure.

As shown in FIG. 1, the speech control system of the first embodiment includes a speech input device 1, a server 2, a false recognition correction device 3, and speech interaction devices 4.

The speech input device 1 acquires a speech uttered by the user and transmits the acquired speech to the server 2. The server 2 transmits and receives data to and from the speech input device 1 and false recognition correction device 3 through a network 5. The server 2 performs a speech recognition process on the speech transmitted by the speech input device 1 and transmits the speech recognition result to the false recognition correction device 3. The false recognition correction device 3 corrects false recognition contained in the speech recognition result received from the server 2 and transmits the false recognition correction result to the server 2. The server 2 determines the type of control to be performed on a corresponding speech interaction device 4 on the basis of the false recognition correction result transmitted by the false recognition correction device 3. The server 2 then transmits the determined type of control to the speech interaction device 4.

Examples of the speech interaction devices 4 include mobile communication terminals, such as a smartphone, and home appliances, such as a television and air conditioner. The corresponding speech interaction device 4 outputs a speech, image, or text and performs device control on the basis of the speech recognition result, the false recognition correction result, and the type of control transmitted by the server 2. The network 5 is, for example, the Internet. The speech input device 1, server 2, false recognition correction device 3, and speech interaction devices 4 are connected to the network 5 using a communication method, such as a wired local area network (LAN), wireless LAN, or Bluetooth®.

In the first embodiment, any one, any two, or all of the speech input device 1, server 2, and false recognition correction device 3 may be incorporated in each of the speech interaction devices 4.

In the first embodiment, the false recognition correction device 3 may perform false recognition correction processes on all the speech interaction devices 4, or by incorporating false recognition correction devices 3 in the speech interaction devices 4, each false recognition correction device 3 may perform a false recognition correction process on a corresponding speech interaction device 4.

Figure 2:
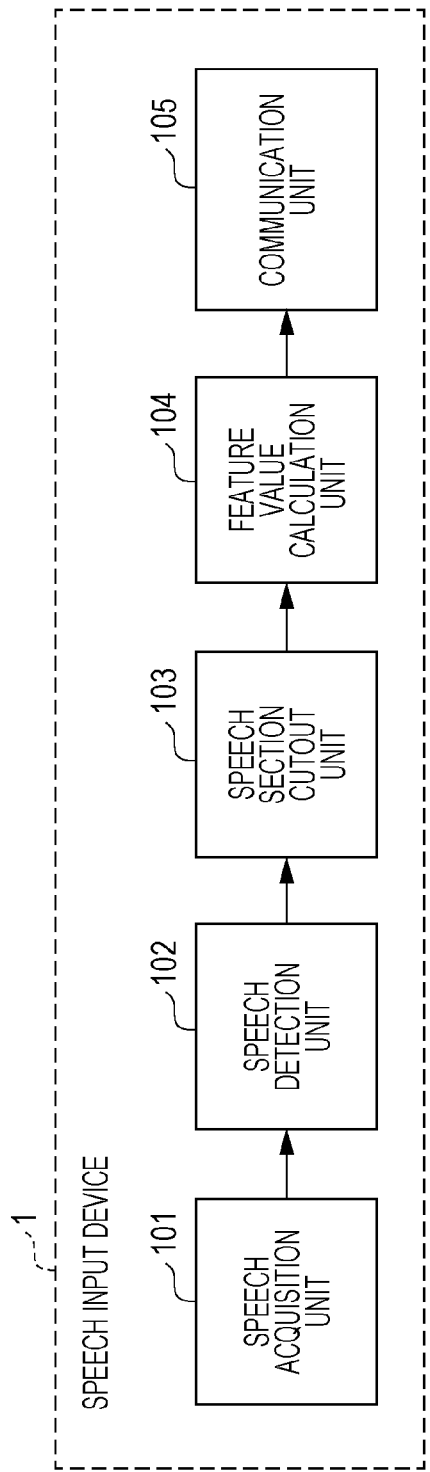
FIG. 2 is a block diagram showing a specific configuration of a speech input device according to the first embodiment of the present disclosure.

FIG. 2 is a block diagram showing a specific configuration of the speech input device according to the first embodiment of the present disclosure. As shown in FIG. 2, the speech input device 1 includes a speech acquisition unit 101, a speech detection unit 102, a speech section cutout unit 103, a feature value calculation unit 104, and a communication unit 105.

The speech acquisition unit 101 acquires a speech uttered by the user. The speech detection unit 102 determines whether the speech has been detected. The speech section cutout unit 103 detects the section in which the speech inputted by the user is present and cuts out the detected speech section. This is because the acquired speech signal includes noise or the like. The feature value calculation unit 104 calculates the feature value of the speech on the basis of the cut-out speech section. The communication unit 105 transmits the speech feature value calculated by the feature value calculation unit 104 to the server 2. The communication unit 105 may transmit the speech feature value calculated by the feature value calculation unit 104 to both the server 2 and false recognition correction device 3.

Examples of the speech input device 1 include microphones incorporated in or connected to the speech interaction devices 4, microphones incorporated in remote controls that come with the speech interaction devices 4 or the like, microphones incorporated in or connected to mobile communication terminals, and sound collection microphones placed in the house.

Figure 3:
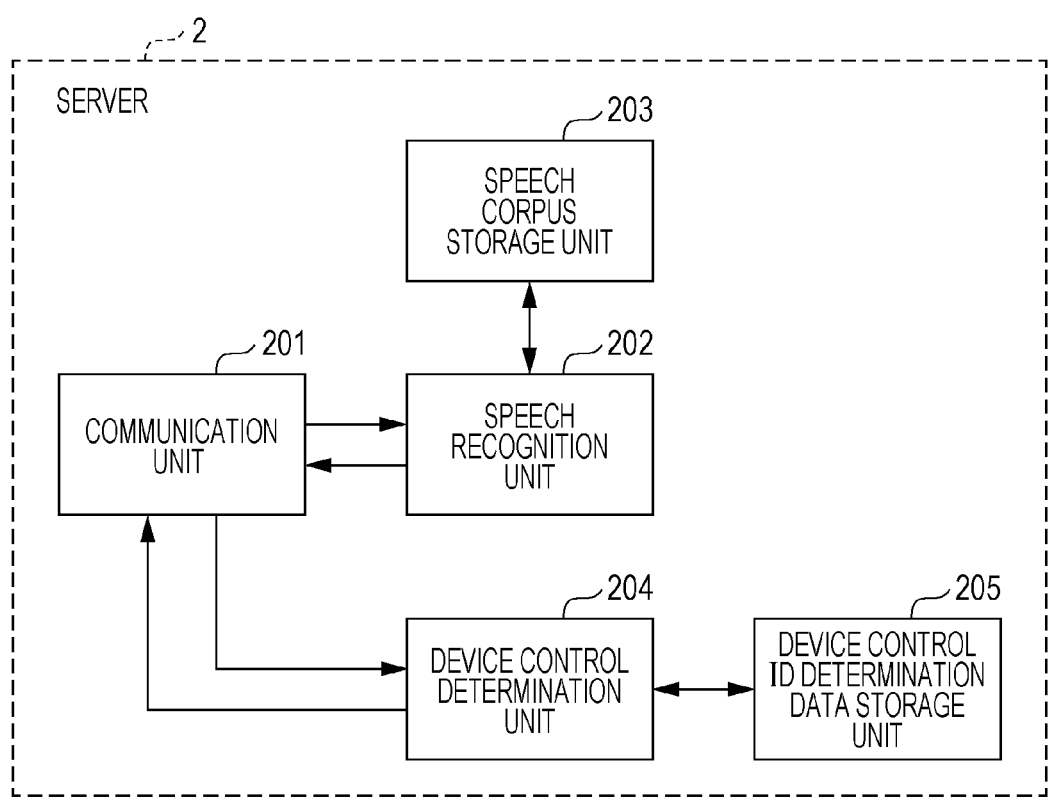
FIG. 3 is a block diagram showing a specific configuration of a server according to the first embodiment of the present disclosure.

FIG. 3 is a block diagram showing a specific configuration of the server according to the first embodiment of the present disclosure. As shown in FIG. 3, the server 2 includes a communication unit 201, a speech recognition unit 202, a speech corpus storage unit 203, a device control determination unit 204, and a device control ID determination data storage unit 205. The server 2 is an example of a speech recognition device.

The communication unit 201 receives the speech feature value transmitted by the communication unit 105 of the speech input device 1, transmits the speech feature value and speech recognition result to the false recognition correction device 3, receives the false recognition correction result transmitted by a communication unit 301 of the false recognition correction device 3, and transmits the speech recognition result, the false recognition correction result, and a device control ID indicating the type of control to a corresponding speech interaction device 4.

The communication unit 201 may transmit only the false recognition correction result to the speech interaction device 4, or may transmit the device control ID and false recognition correction result thereto. The communication unit 201 may also transmit only the speech recognition result to the speech interaction device 4, or may transmit the device control ID and speech recognition result thereto. The communication unit 201 may also transmit the speech recognition result and false recognition correction result to the speech interaction device 4.

The speech recognition unit 202 converts the received speech feature value into a character string or word string on the basis of information about speech sentences stored in the speech corpus storage unit 203. The speech corpus storage unit 203 previously stores speech sentences generated on the basis of commonly available newspaper articles, text files on the Web, or the like. The speech corpus storage unit 203 may store speech sentences that may be inputted to the speech interaction devices 4. The speech corpus storage unit 203 may also store both speech sentences such as newspaper articles or text files on the Web and speech sentences that may be inputted to the speech interaction devices 4. Examples of speech sentences such as newspaper articles or text files on the Web include speech sentences used in small talk, such as "good morning" and "how is the weather today?" Examples of speech sentences that may be inputted to the speech interaction devices 4 include speech sentences specific to the device control of the television, such as "turn on the TV," "power on the TV," and "change the channel to 8."

The device control determination unit 204 determines the type of device control inputted by the user using the device control ID determination data storage unit 205 on the basis of the speech recognition result obtained by the speech recognition unit 202 or the false recognition correction result received by the communication unit 201. The device control ID determination data storage unit 205 stores device control ID determination data in which speech recognition results or false recognition correction results and device control IDs indicating the types of device control are associated with each other. The device control determination unit 204 reads, from the device control ID determination data storage unit 205, a device control ID corresponding to the speech recognition result obtained by the speech recognition unit 202. Or, the device control determination unit 204 reads, from the device control ID determination data storage unit 205, a device control ID corresponding to the false recognition correction result received by the communication unit 201. Note that in the first embodiment, the device control determination unit 204 does not acquire the speech recognition result from the speech recognition unit 202 but rather acquires the speech recognition result transmitted by the false recognition correction device 3 from the communication unit 201.

Figure 4:
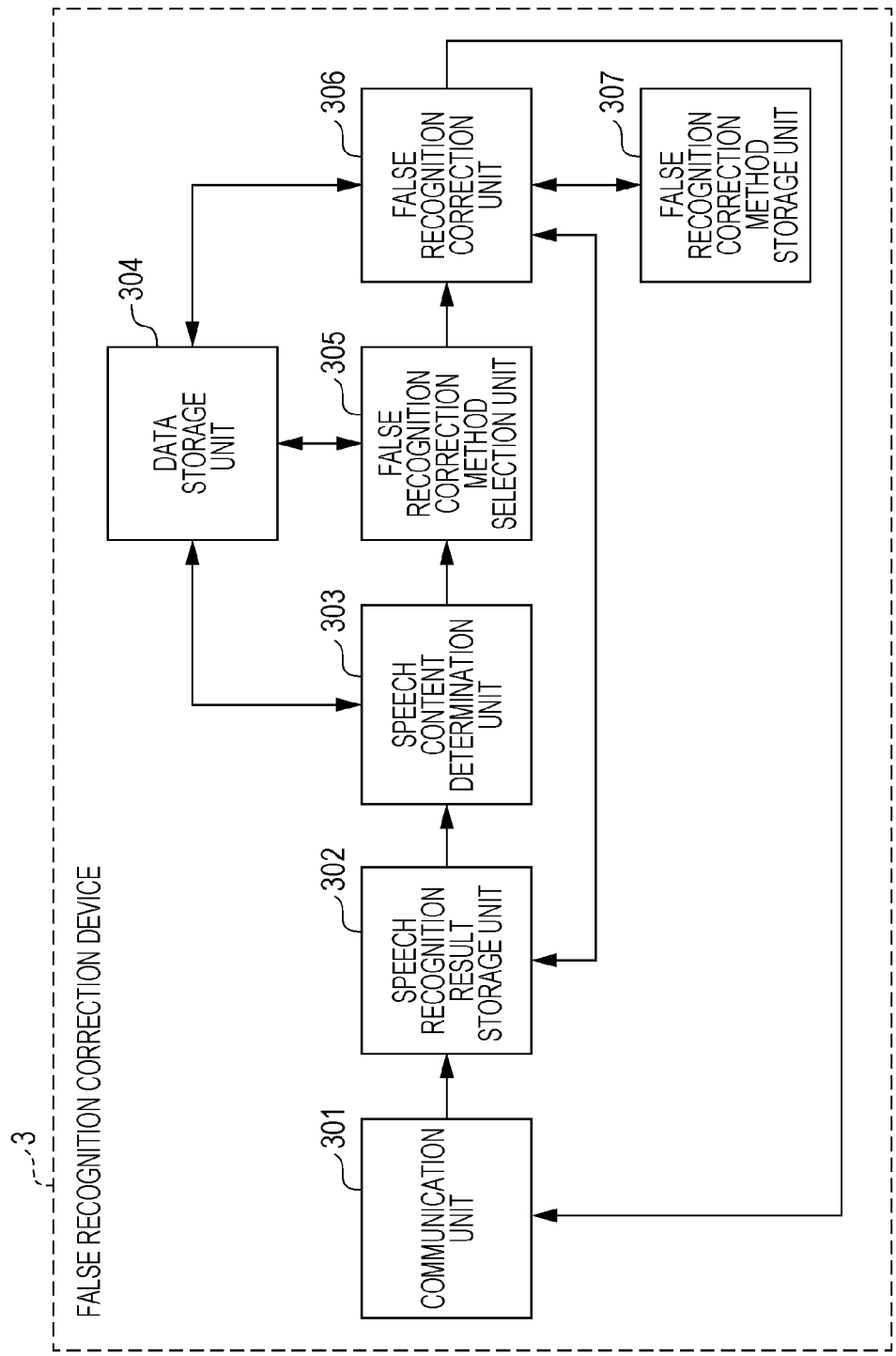
FIG. 4 is a block diagram showing a specific configuration of a false recognition correction device according to the first embodiment of the present disclosure.

FIG. 4 is a block diagram showing a specific configuration of the false recognition correction device according to the first embodiment of the present disclosure. As shown in FIG. 4, the false recognition correction device 3 includes the communication unit 301, a speech recognition result storage unit 302, a speech content determination unit 303, a data storage unit 304, a false recognition correction method selection unit 305, a false recognition correction unit 306, and a false recognition correction method storage unit 307.

The communication unit 301 receives the speech feature value and speech recognition result transmitted by the communication unit 201 of the server 2 and transmits the false recognition correction result to the server 2.

The speech recognition result storage unit 302 stores the speech feature value and speech recognition result received by the communication unit 301.

The data storage unit 304 stores speech content ID determination data in which speech recognition results and speech content IDs identifying the contents of speeches are associated with each other, speech content ID data in which speech content IDs and information about the contents of speeches are associated with each other, false recognition correction method ID determination data in which speech content IDs and false recognition correction method IDs identifying false recognition correction methods are associated with each other, and false recognition correction method ID data in which false recognition correction method IDs and information about false recognition correction methods are associated with each other.

The speech content determination unit 303 determines the content of the speech using the data storage unit 304 on the basis of text data including a character string or a word string acquired as the speech recognition result.

The false recognition correction method selection unit 305 selects a false recognition correction method suitable for the determined content of the speech from multiple false recognition correction methods for correcting the false recognition contained in the text data using the data storage unit 304. Specifically, the false recognition correction method selection unit 305 selects a false recognition correction method suitable for the identified content of the speech with reference to a table in which information identifying the contents of speeches and information identifying the false recognition correction methods are associated with each other.

FIG. 5 is a diagram showing an example of the speech content ID determination data for determining a speech content ID on the basis of a speech recognition result. FIG. 6 is a diagram showing an example of the speech content ID data describing details of speech content IDs.

FIG. 7 is a diagram showing an example of the false recognition correction method ID selection data for selecting a false recognition correction method ID on the basis of a speech content ID. FIG. 8 is a diagram showing an example of the false recognition correction method ID data describing details of false recognition correction method IDs.

For example, if the speech recognition result is "turn on the TV," the speech content determination unit 303 determines that the speech content ID is "C001," with reference to the speech content ID determination data shown in FIG. 5. The false recognition correction method selection unit 305 selects a false recognition correction method ID "RID001" corresponding to the speech content ID "C001" with reference to the false recognition correction method ID selection data shown in FIG. 7. Thus, it is understood that it is preferred to apply, to the speech recognition result "turn on the TV," a similar-phoneme false recognition correction method corresponding to the false recognition correction method ID "RID001."

The false recognition correction method storage unit 307 stores multiple false recognition correction methods associated with multiple false recognition correction method IDs.

The false recognition correction unit 306 corrects the false recognition contained in the text data using the false recognition correction method selected by the false recognition correction method selection unit 305. Specifically, the false recognition correction unit 306 calls a false recognition correction method corresponding to the false recognition correction method ID selected by the false recognition correction method selection unit 305 from the false recognition correction method storage unit 307 and corrects the falsely recognized portion of the speech recognition result stored in the speech recognition result storage unit 302.

The false recognition correction unit 306 may correct the falsely recognized portion using the speech feature value received by the communication unit 301. The false recognition correction unit 306 may also correct the falsely recognized portion using both the speech recognition result stored in the speech recognition result storage unit 302 and the speech feature value received by the communication unit 301.

FIG. 9 is a block diagram showing a specific configuration of a speech interaction device according to the first embodiment of the present disclosure. As shown in FIG. 9, a speech interaction device 4 includes a communication unit 401 and a device control unit 402.

The communication unit 401 receives the device control ID, speech recognition result, and false recognition correction result transmitted by the communication unit 201 of the server 2. The device control unit 402 output a speech, image, or characters using at least one of the device control ID, speech recognition result, and false recognition correction result received by the communication unit 401. The device control unit 402 controls a device, such as a home appliance, using the device control ID.

The device control unit 402 may control the device using only the device control ID. For example, if the user utters a speech "increase the TV volume by one level" and the server 2 determines that the device control ID indicates the volume control of the TV, the device control unit 402 may increase the volume level by one using only the device control ID.

The device control unit 402 may also control the device using the device control ID and one of the speech recognition result and false recognition correction result. For example, if the user utters a speech "increase the TV volume by one level," the server 2 recognizes the speech as "increase TV value by one level," the false recognition correction device 3 corrects the recognized speech into "increase the TV volume by one level," and the server 2 determines that the device control ID indicates the volume control of the TV, the device control unit 402 may increase the volume level of the TV by one using the device control ID and display the speech recognition result "increase the TV value by one level" on the TV screen. The device control unit 402 may also increase the volume level of the TV by one using the device control ID and display the false recognition correction result "increase the TV volume by one level" on the TV screen. As seen above, the speech interaction device 4 can notify the user whether the speech of the user has been successfully inputted, by notifying the user of the speech recognition result or false recognition correction result.

The device control unit 402 may also control the device using all of the device control ID, speech recognition result, and false recognition correction result. For example, if the user utters a speech "increase the TV volume by one level," the server 2 recognizes the speech as "increase TV value by one level," the false recognition correction device 3 corrects the recognized speech into "increase the TV volume by one level," and the server 2 determines that the device control ID indicates the volume control of the TV, the device control unit 402 may increase the volume level of the TV by one using the device control ID and display the speech recognition result "increase the TV value by one level" on the TV screen. After displaying the speech recognition result, the device control unit 402 may display the false recognition correction result "increase the TV volume by one level" on the TV screen. As seen above, the speech interaction device 4 can notify the user that although the false recognition has been contained in the speech recognition result, it has been properly corrected by the false recognition correction process, by notifying the user of both the speech recognition result and false recognition correction result.

Figure 10:
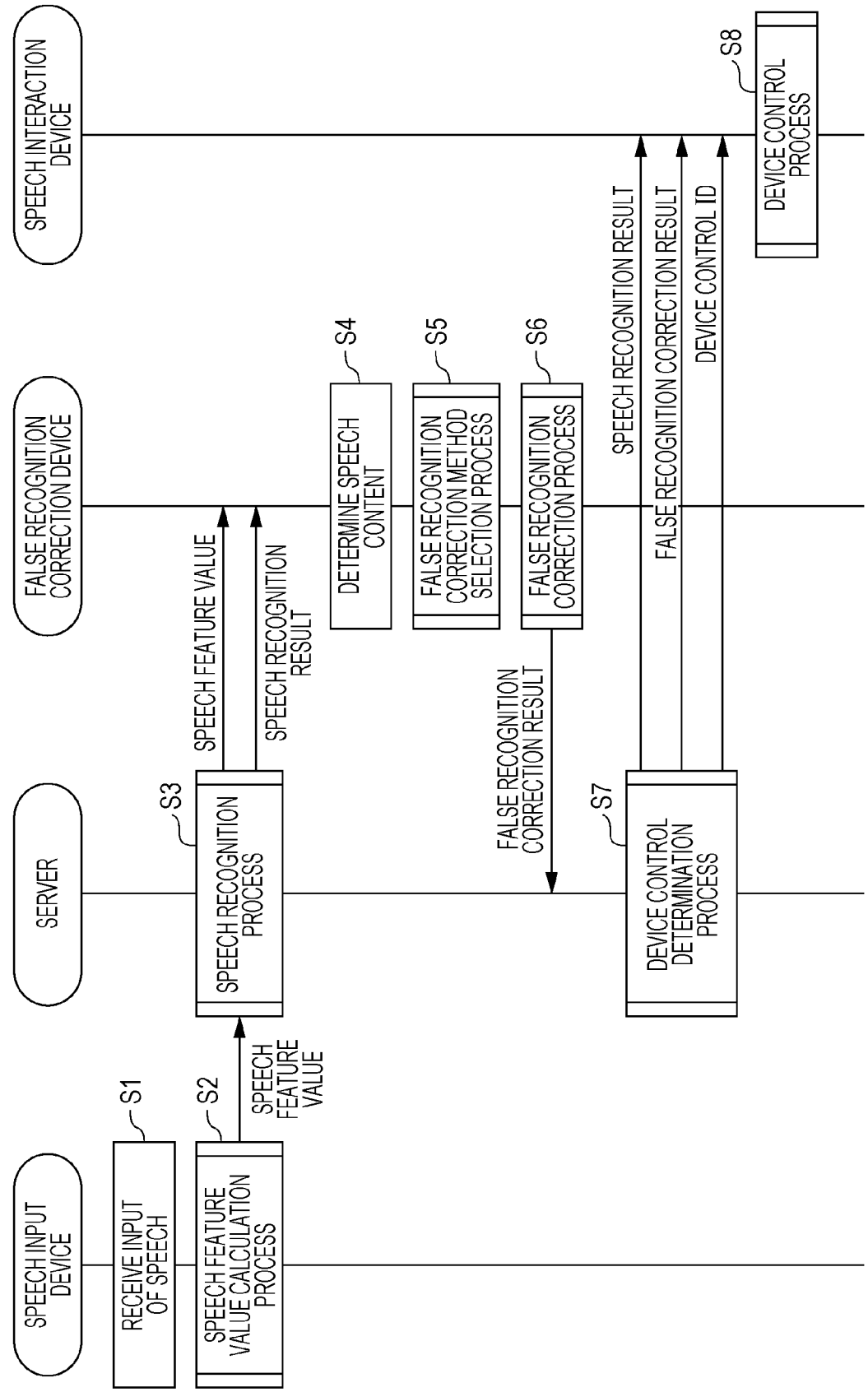
FIG. 10 is a sequence diagram showing the flow of processed performed by the speech control system according to the first embodiment of the present disclosure.

FIG. 10 is a sequence diagram showing the flow of processes performed by the speech control system according to the first embodiment of the present disclosure.

In step S1, the speech acquisition unit 101 of the speech input device 1 receives the input of a speech uttered by the user.

In step S2, the feature value calculation unit 104 calculates the feature value of the received speech. The communication unit 105 transmits the speech feature value calculated by the feature value calculation unit 104 to the server 2.

In step S3, the communication unit 201 of the server 2 receives the speech feature value transmitted by the speech input device 1. The speech recognition unit 202 performs a speech recognition process of converting the received speech feature value into text data including a character string or word string on the basis of information about speech corpus stored in the speech corpus storage unit 203. The communication unit 201 transmits the speech feature value and speech recognition result to the false recognition correction device 3. The communication unit 301 of the false recognition correction device 3 receives the speech feature value and speech recognition result transmitted by the server 2 and stores the received speech feature value and speech recognition result in the speech recognition result storage unit 302.

While, in the first embodiment, the server 2 transmits the speech feature value to the false recognition correction device 3 together with the speech recognition result, the present disclosure is not limited to this configuration. The server 2 may transmit only the speech recognition result to the false recognition correction device 3, and the speech input device 1 may transmit the speech feature value to the false recognition correction device 3.

In step S4, the speech content determination unit 303 of the false recognition correction device 3 determines the content of the speech on the basis of the text data including the character string or the word string acquired as the speech recognition result. At this time, the speech content determination unit 303 determines a speech content ID corresponding to the received speech recognition result with reference to the speech content ID determination data stored in the data storage unit 304.

In step S5, the false recognition correction method selection unit 305 performs a false recognition correction method selection process of selecting a false recognition correction method corresponding to the determined speech content ID from multiple false recognition correction methods for correcting the false recognition contained in the text data. At this time, the false recognition correction method selection unit 305 selects a false recognition correction method ID corresponding to the determined speech content ID from the false recognition correction method ID selection data stored in the data storage unit 304. Thus, the false recognition correction method selection unit 305 selects a false recognition correction method suitable for the false recognition contained in the speech recognition result. The false recognition correction method selection unit 305 then outputs the false recognition correction method ID to the false recognition correction unit 306. Details of the false recognition correction method selection process in step S5 will be described later with reference to FIG. 11.

The false recognition correction method selection unit 305 may determine whether false recognition needs to be corrected, on the basis of the content of the speech determined by the speech content determination unit 303. If it determines that false recognition needs to be corrected, the false recognition correction method selection unit 305 selects a false recognition correction method suitable for the determined content of the speech from the false recognition correction methods; otherwise, it does not select a false recognition correction method.

If the content of the speech relates to the control of the device, the false recognition correction method selection unit 305 may determine that false recognition needs to be corrected. If the content of the speech relates to small talk, the false recognition correction method selection unit 305 may determine that false recognition does not need to be corrected. If the text data contains a character string which is falsely recognized at a higher frequency than a predetermined value, the false recognition correction method selection unit 305 may determine that false recognition needs to be corrected. In this case, the character string which is falsely recognized at the higher frequency than the predetermined value is a parameter used to operate the device which is operated by a speech uttered by the user. The parameter is, for example, a number. The word string which is falsely recognized at the higher frequency than the predetermined value may be a word string having a phoneme similar to that of a previously stored word string. If it is determined that false recognition does not need to be corrected, the communication unit 301 may transmit the speech recognition result to the server 2.

In step S6, the false recognition correction unit 306 performs a false recognition correction process of calling a false recognition correction method corresponding to the false recognition correction method ID outputted in step S5 from the false recognition correction method storage unit 307 and correcting the false recognition contained in the speech recognition result using the called false recognition correction method. The communication unit 301 transmits the false recognition correction result to the server 2. The communication unit 201 of the server 2 receives the false recognition correction result transmitted by the false recognition correction device 3. Details of the false recognition correction process in step S6 will be described later.

In step S7, the device control determination unit 204 of the server 2 performs a device control determination process of determining the type of device control corresponding to the speech recognition result recognized in step S3 or the false recognition correction result transmitted in step S6. Specifically, the device control determination unit 204 extracts a device control ID corresponding to the speech recognition result or false recognition correction result from the device control ID determination data stored in the device control ID determination data storage unit 205. The device control ID extracted here is a device control ID for causing the speech interaction device 4, such as a home appliance, to output a speech, image, or characters or a device control ID for device-controlling the speech interaction device 4. The communication unit 201 transmits the device control ID, speech recognition result, and false recognition correction result to the speech interaction device 4. The communication unit 401 of the speech interaction device 4 receives the device control ID, speech recognition result, and false recognition correction result transmitted by the server 2. Details of the device control determination process in step S7 will be described later.

In step S8, the device control unit 402 controls the operation of the speech interaction device 4 using the device control ID, speech recognition result, and false recognition correction result transmitted in step S7. At this time, the device control unit 402 may determine whether it can perform device control and, if so, may perform device control. For example, if a device control ID corresponding to device control indicating volume control is received with the TV off, the device control unit 402 cannot perform device control and therefore determines that it cannot perform device control.

Figure 11:
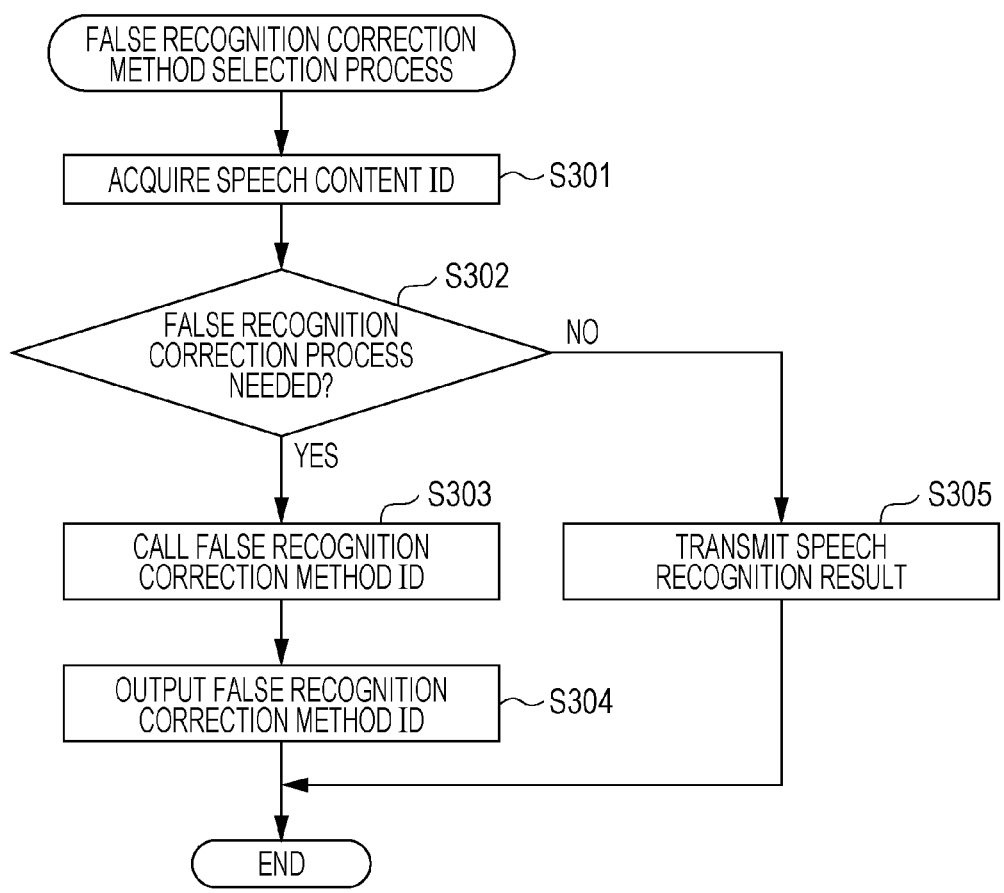
FIG. 11 is a flowchart showing the steps of a false recognition correction method selection process according to the first embodiment of the present disclosure.

FIG. 11 is a flowchart showing the steps of the false recognition correction method selection process according to the first embodiment of the present disclosure. In the false recognition correction method selection process, a false recognition correction method suitable for the false recognition contained in the speech recognition result is selected on the basis of the speech recognition result.

In step S301, the false recognition correction method selection unit 305 acquires a speech content ID determined by the speech content determination unit 303.

In step S302, the false recognition correction method selection unit 305 determines whether the speech recognition result needs to be subjected to a false recognition correction process. The false recognition correction method selection unit 305 makes this determination on the basis of whether the speech content ID determined using the speech content ID determination data in FIG. 5 is a speech content ID which needs to be subjected to false recognition correction. For example, if the speech content ID corresponding to the speech recognition result indicates the device control of the TV and if the device control is falsely recognized, the operability of the device would deteriorate. For this reason, the false recognition correction method selection unit 305 determines that the speech recognition result needs to be subjected to a false recognition correction process.

On the other hand, even if the speech contains false recognition as seen in small talk, if the content of the speech has a less effect on the device control of the user, the false recognition correction method selection unit 305 determines that the speech recognition result does not need to be subjected to a false recognition correction process.

The false recognition correction method selection unit 305 may determine whether the speech recognition result needs to be subjected to a false recognition correction process, on the basis of whether the speech recognition result contains a character string which is more likely to be falsely recognized. For example, if the speech recognition result contains a character string other than a character string which is known to be inputted to the speech interaction device 4 or if the speech recognition result contains a character string that appears less frequently than a known character string, false recognition is more likely to occur. For this reason, the false recognition correction method selection unit 305 may determine whether the speech recognition result needs to be subjected to a false recognition correction process, on the basis of whether the speech recognition result contains a character string other than a character string which is known to be inputted to the speech interaction device 4 or whether the speech recognition result contains a character string that appears less frequently than a known character string.

Specifically, if a speech uttered to device-control the TV is recognized as "poor on the TV," "poor" in the speech recognition result is more likely to be false recognition, since "poor" is a word string that is not typically used when device-controlling the TV. That is, it is conceivable that if the speech recognition result contains a character string or word string that is more likely to be falsely recognized, such as a number or a word string which is close in terms of phoneme, false recognition is more likely to occur. For this reason, the false recognition correction method selection unit 305 may determine whether the speech recognition result needs to be subjected to a false recognition correction process, on the basis of whether the speech recognition result contains a character string or word string that is more likely to be falsely recognized, such as a number or word string which is close in terms of phoneme. Specifically, if the speech recognition result contains a word string "on," "on" is more likely to be falsely recognized as "off," which is close in terms of phoneme.

If it is determined that the speech recognition result needs to be subjected to a false recognition correction process (YES in step S302), the process proceeds to step S303; otherwise (NO in step S302), the process proceeds to step S305.

If it determines that the speech recognition result needs be subjected to a false recognition correction process, the false recognition correction method selection unit 305, in step S303, calls a false recognition correction method ID corresponding to the speech content ID acquired in step S301 with reference to the false recognition correction method ID selection data in FIG. 7.

In step S304, the false recognition correction method selection unit 305 outputs the false recognition correction method ID called in step S303 to the false recognition correction unit 306.

On the other hand, if it is determined that the speech recognition result does not need to be subjected to a false recognition correction process, the communication unit 301, in step S305, transmits the speech recognition result to the server 2 without performing a false recognition correction process. The server 2 receives the speech recognition result from the false recognition correction device 3 and performs a device control determination process on the basis of the received speech recognition result.

Note that if it is determined that the speech recognition result does not need to be subjected to a false recognition correction process, the communication unit 301 may notify the server 2 that the speech recognition result is not subjected to a false recognition correction process, and the server 2 may perform a device control determination process on the basis of the speech recognition result obtained by the speech recognition unit 202.

The speech content ID determination data shown in FIG. 5 includes speech recognition results, input speeches corresponding to the speech recognition results, and speech content IDs. The speech content ID data shown in FIG. 6 includes speech content IDs, speech contents corresponding to the speech content IDs, the types of devices to be controlled, types of device control, and frequently falsely recognized words, which indicate words that are more likely to be falsely recognized. Speech content ID determination data and speech content ID data may be generated for each speech interaction device 4.

For example, if a speech "turn on the TV" is inputted to the speech input device 1 and the server 2 recognizes the speech as "turn off the TV," a speech content ID "C001" is called from the speech content ID determination data in FIG. 5. Note that multiple speech recognition results may be associated with one input speech in the speech content ID determination data. The reason is that a different falsely recognized character string or word string may be generated depending on the user or multiple speech recognition results may be outputted with respect to one input speech depending on the speech recognition engine. Also, multiple input speeches may be associated with one speech content ID in the speech content ID determination data. The reason is that when turning on the TV by inputting a speech, some users utter, for example, a speech "turn on the TV" and others utter, for example, a speech "power on the TV," that is, users are assumed to make different expressions even if they intend the same operation.

The false recognition correction method ID selection data shown in FIG. 7 includes speech content IDs and false recognition correction method IDs corresponding to the speech content IDs. The false recognition correction method ID data shown in FIG. 8 includes false recognition correction method IDs, false recognition correction methods corresponding to the false recognition correction method IDs, and input data required for a false recognition correction process. False recognition correction method ID selection data and false recognition correction method ID data may be generated for each speech interaction device 4.

In FIG. 8, a "similar-phoneme false recognition correction method" refers to a false recognition correction method that converts a word whose false recognition is to be corrected into one of multiple words having similar phonemes under a predetermined rule. The similar-phoneme false recognition correction method can be implemented, for example, by managing words and phonemes in a false recognition correction dictionary used in a false recognition correction process in such a manner that the words and phonemes are associated with each other. If a false recognition correction process is performed using the similar-phoneme false recognition correction method, the speech feature value is used as input data, since a word having a similar phoneme needs to be determined.

In FIG. 8, a "parameter-specialized false recognition correction method" refers to a false recognition correction method that converts a word whose false recognition is to be corrected into a word relating to a parameter, of multiple words having similar phonemes under a predetermined rule. The parameter here is, for example, a number or alphabet. The parameter-specialized false recognition correction method can be implemented, for example, by assigning higher priorities to words relating to parameters (e.g., a number), of multiple words having similar phonemes in a false recognition correction dictionary used in a false recognition correction process. If a false recognition correction process is performed using the parameter-specialized false recognition correction method, the speech recognition result and speech feature value are used as input data, since a word relating to a parameter (e.g., a number) needs to be determined in a character string or phoneme.

In FIG. 8, a "context-dependent false recognition correction method" refers to a false recognition correction method that converts a word whose false recognition is to be corrected into another word corresponding to the context. The false recognition correction unit 306 can implement the context-dependent false recognition correction method, for example, by learning the arrangement of words from correct sentences and some falsely recognized sentences of the correct sentences. If a false recognition correction process is performed using the context-dependent false recognition correction method, the speech recognition result is used as input data, since the arrangement of words needs to be determined on the basis of the recognized character string.

For example, if a speech "turn on the TV" is inputted to the speech input device 1, the server 2 recognizes the speech as "turn off the TV," and the speech content ID "C001" is called from the speech content ID determination data in FIG. 5, it is understood from FIGS. 7 and 8 that it is preferred to use the similar-phoneme false recognition correction method having a false recognition correction method ID "RID001" with respect to the speech recognition result "turn off the TV." Multiple speech content IDs may be associated with one false recognition correction method ID in the false recognition correction method ID selection data. Also, multiple false recognition correction method IDs may be associated with one speech content ID.

The false recognition correction method selection unit 305 may automatically assign a false recognition correction method ID to a speech content ID indicating the content of the inputted speech by using a learning model that automatically assigns a false recognition correction method ID to a speech content ID on the basis of the data shown in FIGS. 5, 6, 7, and 8 and the frequency of appearance of a character string or word string in the input speech.

Figure 12:
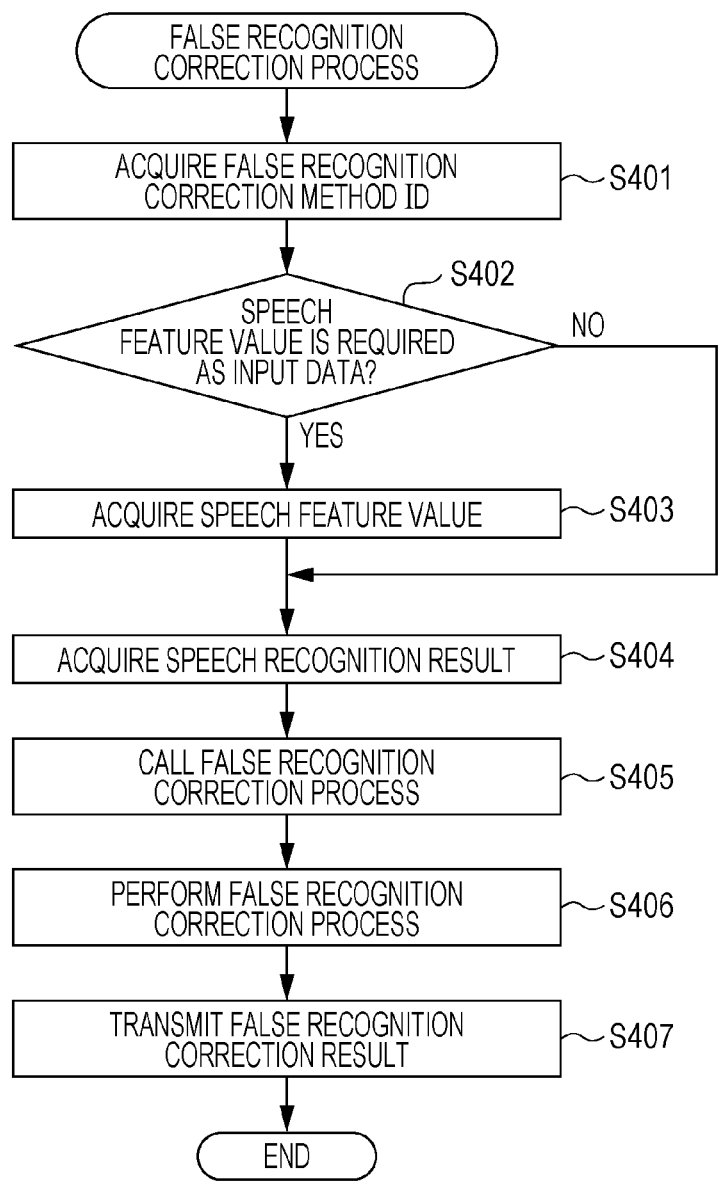
FIG. 12 is a flowchart showing the steps of a false recognition correction process according to the first embodiment of the present disclosure.

FIG. 12 is a flowchart showing the steps of a false recognition correction process according to the first embodiment of the present disclosure. The false recognition correction process is performed on false recognition contained in the speech recognition result on the basis of a false recognition correction method ID.

In step S401, the false recognition correction unit 306 acquires a false recognition correction method ID from the false recognition correction method selection unit 305.

In step S402, the false recognition correction unit 306 determines whether the speech feature value is required as input data in a false recognition correction process, with reference to the false recognition correction method ID data shown in FIG. 8 stored in the data storage unit 304. If it is determined that the speech feature value is required as input data (YES in step S402), the process proceeds to step S403; otherwise (NO in step S402), the process proceeds to step S404.

The case in which the speech feature value is required in a false recognition correction process is a case in which a speech containing a character string or word string having a similar phoneme, a speech containing a number, or the like contains false recognition whose presence is difficult to determine on the basis of the preceding or following character string or word string. For example, if the user utters a speech "turn on the TV" and the speech is recognized as "turn off the TV," it is difficult to determine that "off" is false recognition, on the basis of the preceding and following words, "turn" and "TV," since "turn off the TV" is a speech that the user is more likely to utter when device-controlling the TV. For this reason, the false recognition correction unit 306 re-inputs the speech feature value to a speech recognition engine specialized in the recognition of speeches "on" and "off." Thus, the false recognition "turn off the TV" can be corrected into "turn on the TV."

As shown in FIG. 8, if the selected false recognition correction method is the similar-phoneme false recognition correction method, the speech feature value is required as input data; if the selected false recognition correction method is the parameter-specialized false recognition correction method, the speech feature value and speech recognition result are required as input data; and if the selected false recognition correction method is the context-dependent false recognition correction method, the speech recognition result is required as input data. The false recognition correction unit 306 corrects the false recognition in the text data using at least one of the speech recognition result and speech feature value in accordance with the selected false recognition correction method.

If it determines that the speech feature value is required as input data, the false recognition correction unit 306, in step S403, acquires the speech feature value from the speech recognition result storage unit 302.

After acquiring the speech feature value or if it determines that the speech feature value is not required as input data, the false recognition correction unit 306, in step S404, acquires a character string or word string as the speech recognition result from the speech recognition result storage unit 302.

If the process does not proceed to step S403 and the false recognition is corrected using only the speech recognition result acquired in step S404, the false recognition can be corrected using context information and the trend of occurrence of false recognition. For example, if the user utters a speech "power on the TV" and the speech is recognized as "poor on the TV," the false recognition correction unit 306 can correct "poor on the TV" into "power on the TV" if there is information indicating that "poor" is inappropriate as a word string that appears concurrently with "TV" and "on" and "poor" is more likely to appear as the false recognition of "power."

In step S405, the false recognition correction unit 306 calls a false recognition correction method corresponding to the false recognition correction method ID acquired in step S401 from the false recognition correction method storage unit 307.

In step S406, the false recognition correction unit 306 performs the false recognition correction method called in step S405 using the speech recognition result acquired in step S404 and/or the speech feature value acquired in step S403. If it determines in step S402 that the speech feature value is required as input data, the false recognition correction unit 306 may perform a false recognition correction process using both the speech feature value received in step S403 and the speech recognition result acquired in step S404, or may perform a false recognition correction process using only the speech feature value acquired in step S403.

In step S407, the communication unit 301 transmits the false recognition correction result obtained in step S406 to the server 2.

In the first embodiment, if it determines that the speech feature value is required as input data, the false recognition correction unit 306 acquires the speech feature value stored in the speech recognition result storage unit 302; however, the present disclosure is not limited to this configuration. If the speech feature value is not transmitted by the server 2 and therefore is not stored in the speech recognition result storage unit 302, the communication unit 301, in step S403, may request the server 2 to transmit the speech feature value and then receive the speech feature value from the server 2. The communication unit 301 may also request the speech input device 1 to transmit the speech feature value and then receive the speech feature value from the speech input device 1.

Figure 13:
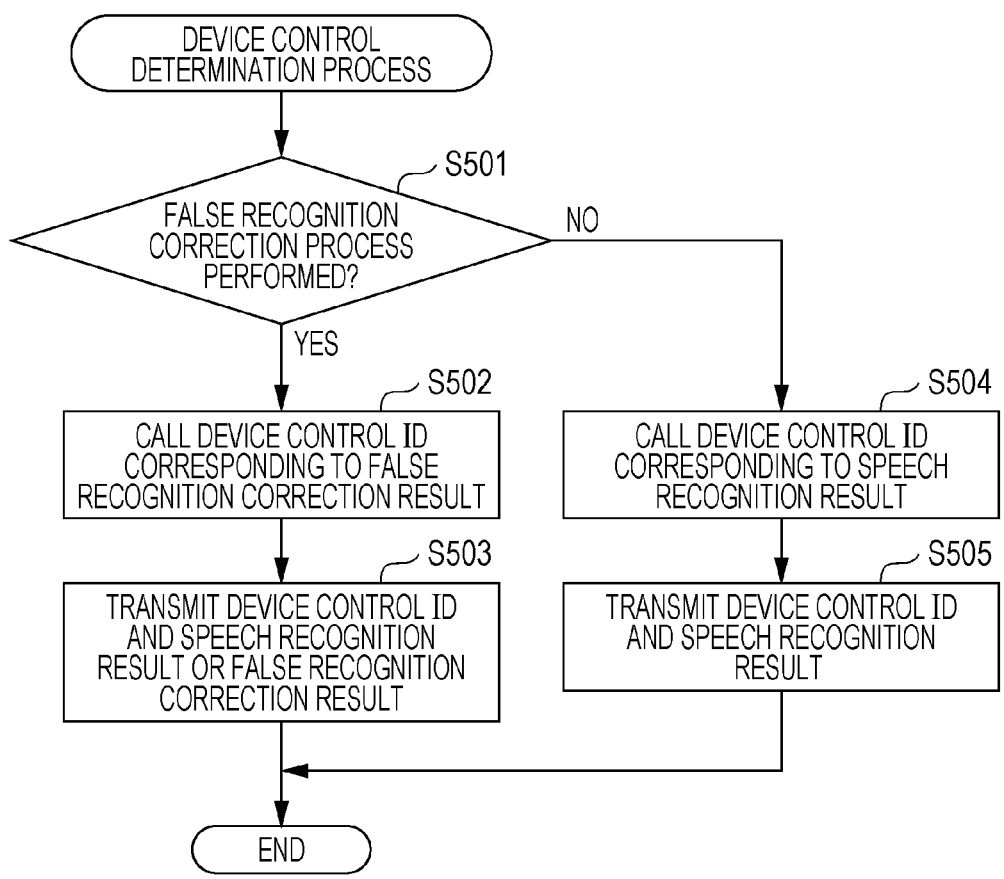
FIG. 13 is a flowchart showing the steps of a device control determination process according to the first embodiment of the present disclosure.

FIG. 13 is a flowchart showing the steps of a device control determination process according to the first embodiment of the present disclosure. In the device control determination process, how to control the device is determined on the basis of the speech recognition result or false recognition correction result.

In step S501, the device control determination unit 204 determines whether the speech recognition result has been subjected to a false recognition correction process in the false recognition correction device 3. If so, the communication unit 201 receives the false recognition correction result from the false recognition correction device 3; if not so, the communication unit 201 receives the speech recognition result from the false recognition correction device 3. Thus, if the communication unit 201 receives the false recognition correction result from the false recognition correction device 3, the device control determination unit 204 determines that a false recognition correction process has been performed; if the communication unit 201 receives the speech recognition result from the false recognition correction device 3, it determines that a false recognition correction process has not been performed.

If it is determined that a false recognition correction process has been performed (YES in step S501), the process proceeds to step S502; if it is determined that a false recognition correction process has not been performed (NO in step S501), the process proceeds to step S504.

If it determines that a false recognition correction process has been performed, the device control determination unit 204, in step S502, calls a device control ID corresponding to the false recognition correction result from the device control ID determination data storage unit 205.

In step S503, the communication unit 201 transmits the device control ID called in step S502 and the false recognition correction result or speech recognition result to the speech interaction device 4.

If it determines that a false recognition correction process has not been performed, the device control determination unit 204, in step S504, calls a device control ID corresponding to the speech recognition result from the device control ID determination data storage unit 205.

In step S505, the communication unit 201 transmits the device control ID called in step S504 and the speech recognition result to the speech interaction device 4.

FIG. 14 is a diagram showing an example of device control ID determination data for determining a device control ID on the basis of the speech recognition result or false recognition correction result. FIG. 15 is a diagram showing an example of device control ID data describing details of device control IDs.

The device control ID determination data shown in FIG. 14 includes speech recognition results or false recognition correction results and device control IDs corresponding to the speech recognition results or false recognition correction results. The device control ID data shown in FIG. 15 includes device control IDs, the types of control corresponding to the device control IDs, the types of devices to be controlled, and details of device control. Device control ID determination data and device control ID data may be generated for each speech interaction device 4.

For example, if a speech "power on the TV" is inputted to the speech input device 1, the server 2 recognizes the speech as "poor on the TV," and the false recognition correction device 3 corrects the recognized speech into "power on the TV," a device control ID "M001" is called from the device control ID determination data in FIG. 14. Note that multiple speech recognition results or false recognition correction results may be associated with one device control ID in the device control ID determination data. The reason is that when turning on the TV by inputting a speech, some users utter, for example, a speech "turn on the TV" and others utter, for example, a speech "power on the TV," that is, users are assumed to make different expressions even if they intend the same operation.

The device control determination unit 204 may automatically assign a device control ID to the received speech recognition result or false recognition correction result by using a learning model that automatically determines a device control ID on the basis of the data shown in FIGS. 14 and 15 and the frequency of appearance of a character string or word string in the input speech.

Figure 16:
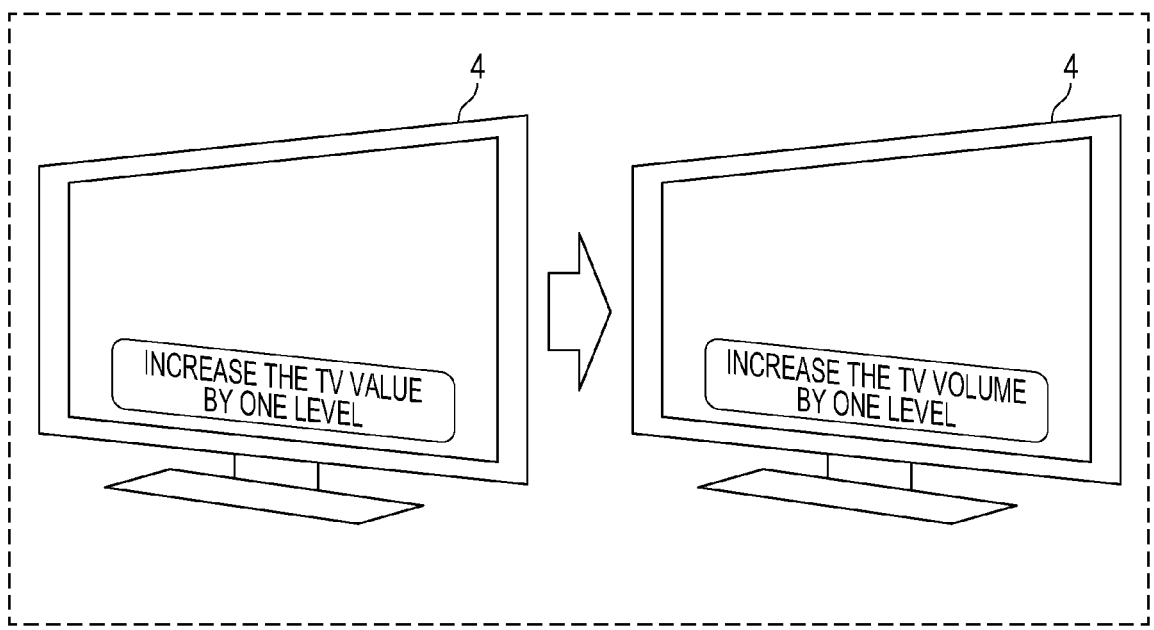
FIG. 16 is a diagram showing an example of display screens notifying the user of the speech recognition result or false recognition correction result in the speech control system according to the first embodiment of the present disclosure.
Figure 17:
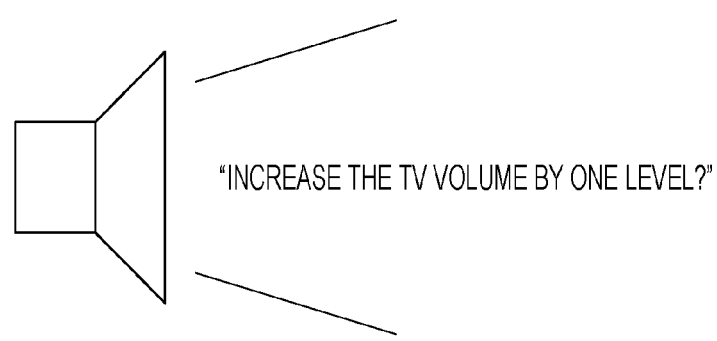
FIG. 17 is a diagram showing an example of an output speech notifying the user of the false recognition correction result in the speech control system according to the first embodiment of the present disclosure.

FIG. 16 is a diagram showing an example of display screens notifying the user of the speech recognition result or false recognition correction result in the speech control system of the first embodiment of the present disclosure. FIG. 17 is a diagram showing an example of an output speech notifying the user of the false recognition correction result in the speech control system of the first embodiment of the present disclosure.

The speech interaction device 4 may notify the user of at least one of the text data acquired as the speech recognition result and the false recognition-corrected text data.

If false recognition occurs in the speech recognition result and the false recognition is corrected by the false recognition correction device 3, the speech interaction device 4 notifies the user that a false recognition correction process has been performed. FIGS. 16 and 17 show examples in which the TV, which is an example of the speech interaction device 4, notifies the user who is operating the volume of the TV by inputting a speech that a false recognition correction process has been performed. As shown in FIG. 16, the speech interaction device 4 displays the speech recognition result including false recognition "increase the TV value by one level" on the display screen. Subsequently, the speech interaction device 4 displays a false recognition correction result "increase the TV volume by one level" obtained by performing a false recognition correction process, on the display screen. As shown in FIG. 17, for example, the speech interaction device 4 may output a speech for checking whether the false recognition correction result is correct stating "increase the TV volume by one level?" from the speaker of the TV or remote control.

Depending on the reliability of the speech recognition result, the speech interaction device 4 may check whether the false recognition correction result is correct, by displaying a character string on the display screen. Also, depending on the reliability of the speech recognition result, the speech interaction device 4 may check whether the false recognition correction result is correct, by outputting a speech from the speaker. For example, if the reliability of the speech recognition result "increase the TV value by one level" is lower than a threshold, the speech recognition result is more likely to contain false recognition. For this reason, the speech interaction device 4 may check whether the false recognition correction result is correct, by displaying a character string "increase the TV volume by one level?" on the screen or outputting a speech "increase the TV volume by one level?" from the speaker.

Figure 18:
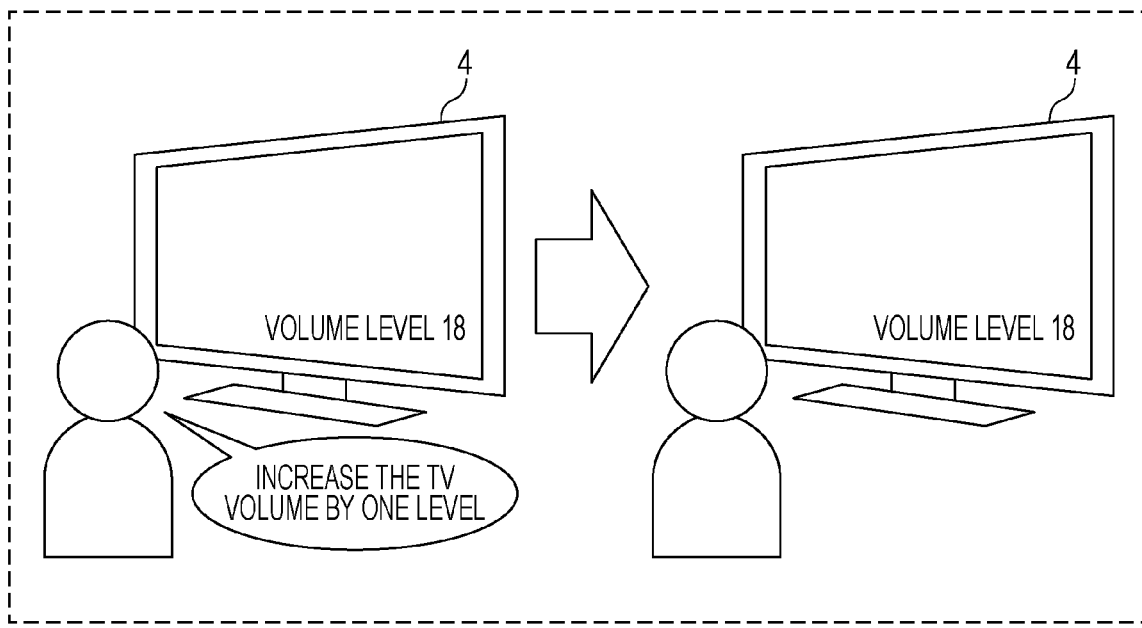
FIG. 18 is a diagram showing an example in which the speech control system of the first embodiment of the present disclosure has failed to correct false recognition contained in the speech recognition result using the false recognition correction device and thus failed to control the device properly.
Figure 19:
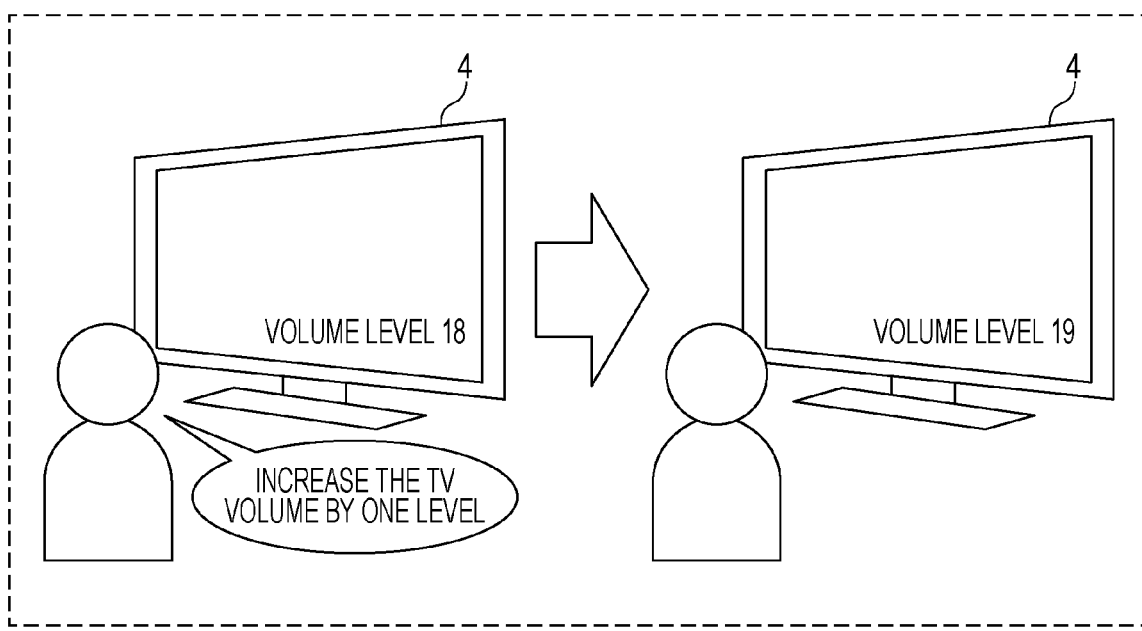
FIG. 19 is a diagram showing an example in which by learning the speech recognition result, the speech control system of the first embodiment of the present disclosure has succeeded in correcting false recognition contained in the speech recognition result using the false recognition correction device and thus succeeded in controlling the device properly.

FIGS. 18 and 19 are diagrams showing a learning operation in the speech control system according to the first embodiment of the present disclosure. FIG. 18 is a diagram showing an example in which the speech control system of the first embodiment of the present disclosure has failed to correct the false recognition contained in the speech recognition result using the false recognition correction device and thus failed to control the device properly. FIG. 19 is a diagram showing an example in which by learning the speech recognition result, the speech control system of the first embodiment of the present disclosure has succeeded in correcting the false recognition contained in the speech recognition result using the false recognition correction device and thus succeeded in controlling the device properly.

If the false recognition correction device 3 has failed to correct the false recognition contained in the recognition result of the speech of the user in the first false recognition correction process but succeeded in correcting the false recognition in the second false recognition correction process, the speech interaction device 4 notifies the user that the false recognition correction process has been performed using the learning function of the false recognition correction device 3.

Described below is an example in which learning of the false recognition correction process is performed based on an action of the user who is operating the volume of the TV by inputting a speech. The TV is an example of the speech interaction device 4. As shown in FIG. 18, if the user utters a first speech "increase the TV volume by one level," the speech is recognized as "increase the TV value by one level," and the false recognition correction result obtained by the false recognition correction device 3 is also "increase the TV value by one level," the volume control of the TV is not performed. In this case, if the user utters the same speech again or directly operates the volume using the remote control, the false recognition correction device 3 learns that "increase the TV value by one level" is a fault and the volume control must be corrected. As shown in FIG. 19, on the other hand, if the user utters a second speech "increase the TV volume by one level" and the speech is recognized as "increase the TV value by one level," "increase the TV value by one level" is corrected into "increase the TV volume by one level" by learning from the fault in the recognition result of the first speech that "increase the TV value by one level" indicates volume control. As seen above, the volume of the TV can be controlled even if the speech recognition result contains false recognition. Note that learning is not necessarily completed with the second speech and the false recognition correction device 3 may learn from the output of the speech recognition result including the same false recognition twice or more.

A specific example of the above processes will be described with reference to FIG. 10. For example, assume that the user utters a speech "turn on the TV" toward the TV. The speech input device 1 receives the input of the speech uttered by the user (step S1) and performs a speech feature value calculation process (step S2) on the inputted speech. The speech input device 1 then performs a speech recognition process (step S3) of converting the received speech feature value into a character string or word string on the basis of the information stored in the speech corpus storage unit 203 and obtains "turn off the TV" as the speech recognition result.

The false recognition correction device 3 determines the content of the speech on the basis of the speech recognition result (step S4) and performs a false recognition correction method selection process (step S5) on the basis of the determined content of the speech. As a result, the false recognition correction device 3 selects the similar-phoneme false recognition correction method with respect to the speech recognition result "turn off the TV." The false recognition correction device 3 then performs a false recognition correction process (step S6) using the selected similar-phoneme false recognition correction method and corrects "turn off the TV" into "turn on the TV."

The server 2 performs a device control determination process (step S7) on the basis of the false recognition correction result. The speech interaction device 4 controls the device, that is, powers on the TV on the basis of the determination (step S8).

Subsequently, for example, if the user feels that the TV volume is not sufficient, he or she utters a speech "increase the TV volume by one level." Then, processes from a speech feature value calculation process (step S2) to a device control determination process (step S7) are performed in a similar manner to those performed with respect to the first speech. At this time, assume that the speech recognition result is "increase the TV value by one level" and the false recognition correction result is "increase the TV volume by one level." To notify the user that a false recognition correction process has been performed, the speech interaction device 4 first displays a character string "increase the TV value by one level," which is the speech recognition result containing false recognition, on the display screen. The speech interaction device 4 then displays a character string "increase the TV volume by one level," which is the false recognition correction result.

As seen above, even if the recognition result of a speech inputted by the user to device-control the TV contains false recognition, the speech control system of the first embodiment can correct the false recognition and control the device without having to previously acquire information from the user.

In the first embodiment, the speech interaction device 4 may notify the user which of the multiple false recognition correction methods has been selected.

Second Embodiment

Figure 20:
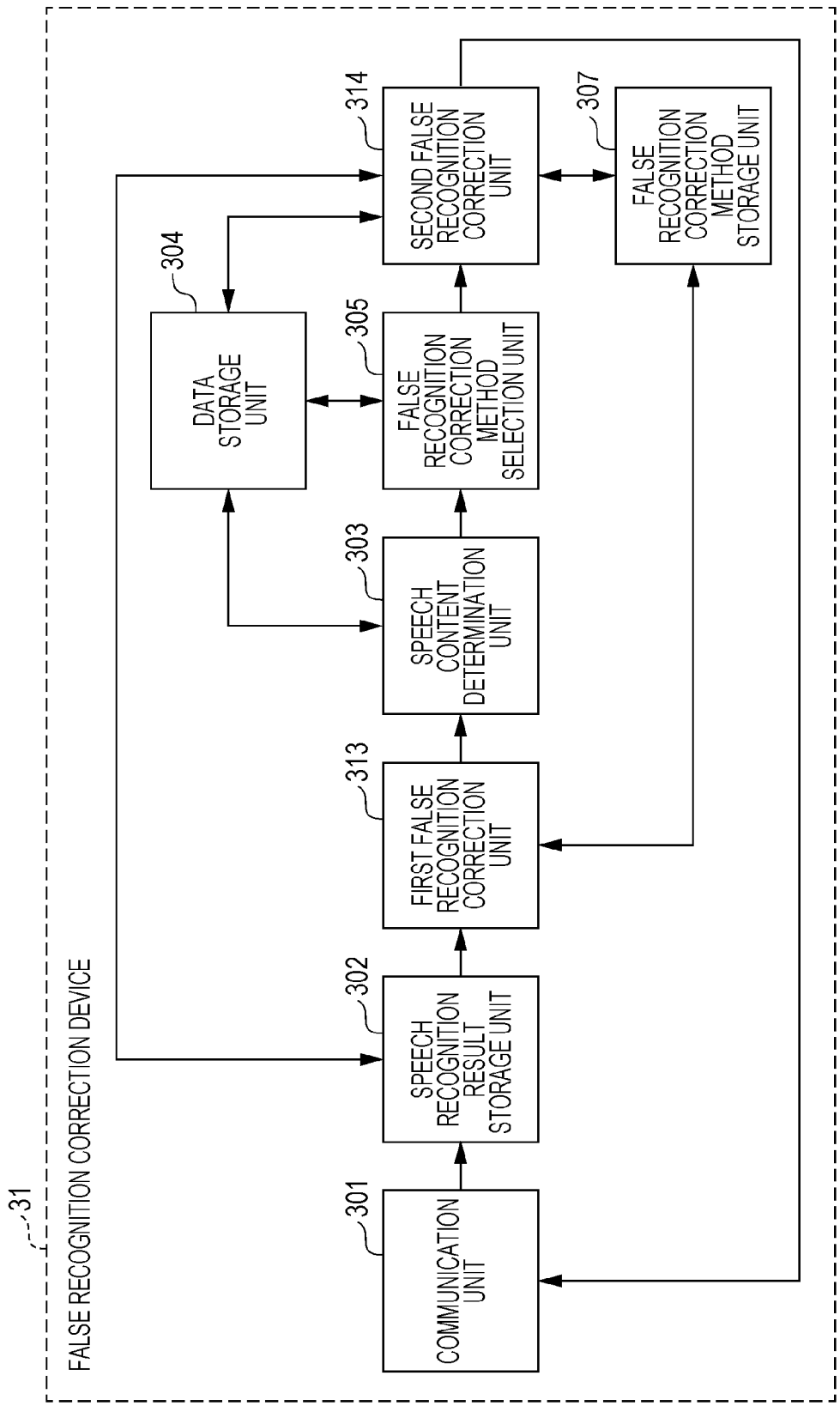
FIG. 20 is a block diagram showing a specific configuration of a false recognition correction device according to a second embodiment of the present disclosure.

FIG. 20 is a block diagram showing a specific configuration of a false recognition correction device according to a second embodiment of the present disclosure. Compared to the configuration of the false recognition correction device 3 shown in FIG. 4, a false recognition correction device 31 additionally includes a first false recognition correction unit 313, as well as includes a second false recognition correction unit 314 in place of the false recognition correction unit 306.

As shown in FIG. 20, the false recognition correction device 31 includes a communication unit 301, a speech recognition result storage unit 302, a speech content determination unit 303, a data storage unit 304, a false recognition correction method selection unit 305, a false recognition correction method storage unit 307, the first false recognition correction unit 313, and the second false recognition correction unit 314. In the second embodiment, the same elements as those in the first embodiment are given the same reference signs and will not be described.

The first false recognition correction unit 313 preliminarily corrects false recognition contained in text data using a predetermined first false recognition correction method (a preliminary false recognition correction method). Specifically, the first false recognition correction unit 313 preliminarily corrects the false recognition of a word whose false recognition occurs at a higher frequency than a predetermined value, of words contained in text data using the predetermined first false recognition correction method before the false recognition correction method selection unit 305 selects a second false recognition correction method. By correcting the false recognition contained in the speech recognition result using the first false recognition correction unit 313 before the false recognition correction method selection unit 305 selects the second false recognition correction method, the selection of a wrong false recognition correction method can be reduced.

The speech content determination unit 303 determines the content of the speech on the basis of the text data whose false recognition has been preliminarily corrected.

The second false recognition correction unit 314 corrects the false recognition contained in the speech recognition result (text data) using the second false recognition correction method selected by the false recognition correction method selection unit 305. The configuration of the second false recognition correction unit 314 is the same as that of the false recognition correction unit 306 of the first embodiment.

For example, if it is known that false recognition in which "power" is converted into "poor" occurs at a high frequency when controlling the operation of the TV, the first false recognition correction unit 313 corrects the word "poor" contained in the speech recognition result into the word "power" using the context-dependent false recognition correction method. Thus, if the user utters a speech "turn on the TV" and the speech is recognized as "poor off the TV," the first false recognition correction unit 313 corrects the speech recognition result into "turn off the TV," and the false recognition correction method selection unit 305 selects the similar-phoneme false recognition correction method as the second false recognition correction method. As a result, the second false recognition correction unit 314 corrects the false recognition using the similar-phoneme false recognition correction method, which is excellent in correcting words having similar phonemes. That is, the second false recognition correction unit 314 corrects "turn off the TV" into "turn on the TV."

The first false recognition correction method used by the first false recognition correction unit 313 and the second false recognition correction method used by the second false recognition correction unit 314 may be the same or different.

While, in the second embodiment, the first false recognition correction unit 313 corrects the false recognition contained in the speech recognition result using the predetermined first false recognition correction method, the present disclosure is not limited to this configuration. For example, the following configuration may be used: the speech content determination unit 316 determines the content of the speech on the basis of the speech recognition result; the false recognition correction method selection unit 305 selects two false recognition correction methods (first and second false recognition correction methods) on the basis of the determined content of the speech; the first false recognition correction unit 313 corrects false recognition contained in the speech recognition result using the first false recognition correction method selected by the false recognition correction method selection unit 305; and the second false recognition correction unit 314 re-corrects the false recognition in the speech recognition result corrected by the first false recognition correction unit 313 using the second false recognition correction method selected by the false recognition correction method selection unit 305.

The configurations of a speech input device, a server, and speech interaction devices of the second embodiment of the present disclosure are the same as those of the first embodiment and therefore will not be described. The operation of a speech control system of the second embodiment of the present disclosure is also the same as that of the first embodiment except for the operation of the false recognition correction device 31 and therefore will not be described.

Third Embodiment

Figure 21:
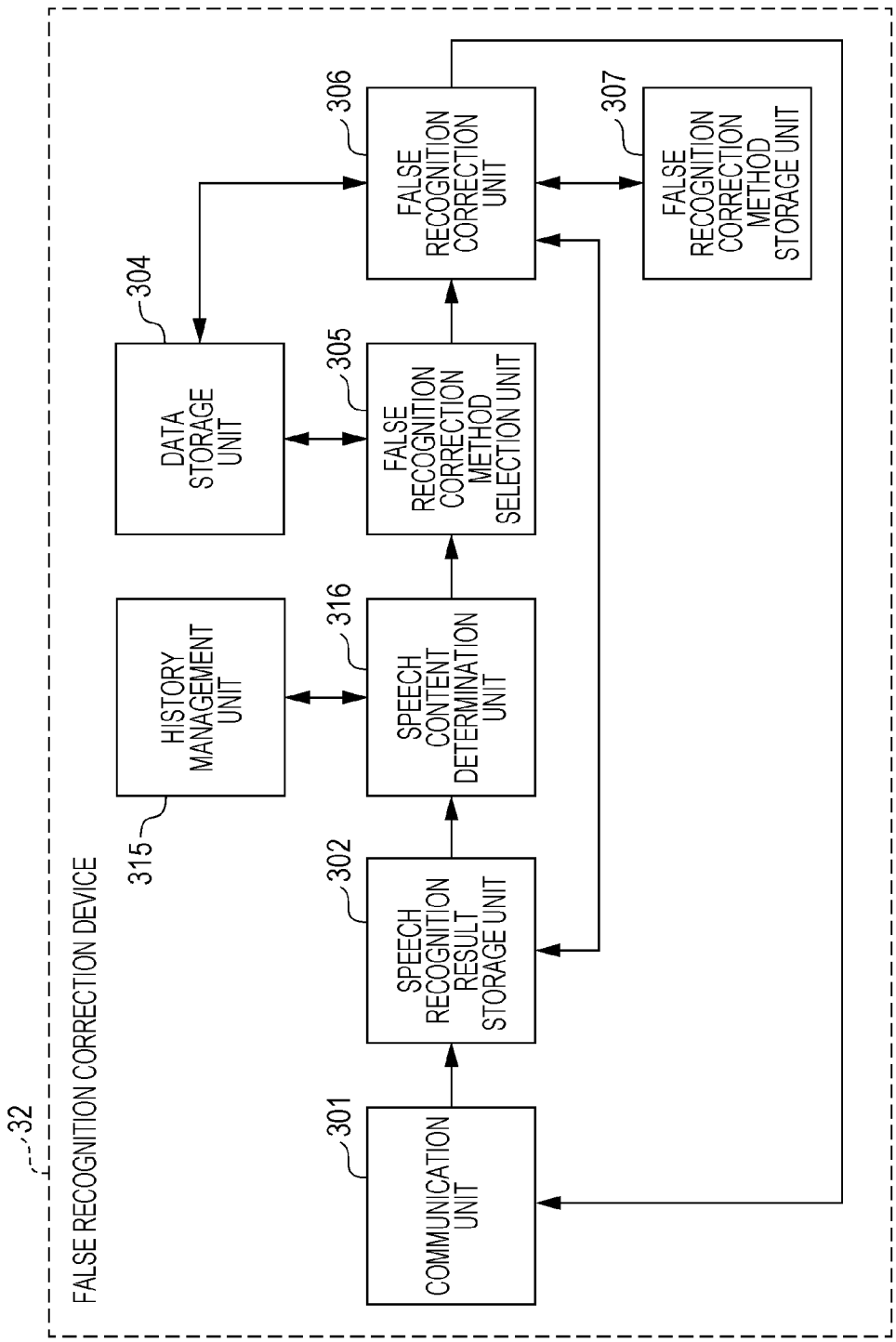
FIG. 21 is a block diagram showing a specific configuration of a false recognition correction device according to a third embodiment of the present disclosure.

FIG. 21 is a block diagram showing a specific configuration of a false recognition correction device according to a third embodiment of the present disclosure. Compared to the configuration of the false recognition correction device 3 shown in FIG. 4, a false recognition correction device 32 further includes a history management unit 315.

The false recognition correction device 32 shown in FIG. 21 includes a communication unit 301, a speech recognition result storage unit 302, a data storage unit 304, a false recognition correction method selection unit 305, a false recognition correction unit 306, a false recognition correction method storage unit 307, the history management unit 315, and a speech content determination unit 316. In the third embodiment, the same elements as those in the first embodiment are given the same reference signs and will not be described.

The history management unit 315 stores various types of log information, including the history of the interactions between the user and speech control system and the history of device control.

The speech content determination unit 316 acquires the current situation of a device operated by a speech of the user with reference to the log information stored in the history management unit 315 and predicts the content of the speech on the basis of the acquired current situation of the device.

The false recognition correction method selection unit 305 selects a false recognition correction method suitable for the content of the speech predicted by the speech content determination unit 316 from among multiple false recognition correction methods.

For example, when the user utters a certain speech, the speech content determination unit 316 determines the content of a speech which is often uttered subsequent to that speech, with reference to the history of interactions stored in the history management unit 315. The false recognition correction method selection unit 305 selects a false recognition correction method suitable for the determined content of the speech.

If the speech content determination unit 316 determines that the device to be controlled is currently turned off, with reference to the history of device control stored in the history management unit 315, it predicts that the content of a subsequent speech for controlling the device to be controlled is to turn on the device to be controlled. The false recognition correction method selection unit 305 selects a false recognition correction method suitable for the predicted content of the speech.

The configurations of a speech input device, a server, and speech interaction devices of the third embodiment of the present disclosure are the same as those of the first embodiment and therefore will not be described. The operation of a speech control system of the third embodiment of the present disclosure is also the same as that of the first embodiment except for the operation of the false recognition correction device 32 and therefore will not be described.

Fourth Embodiment

Figure 22:
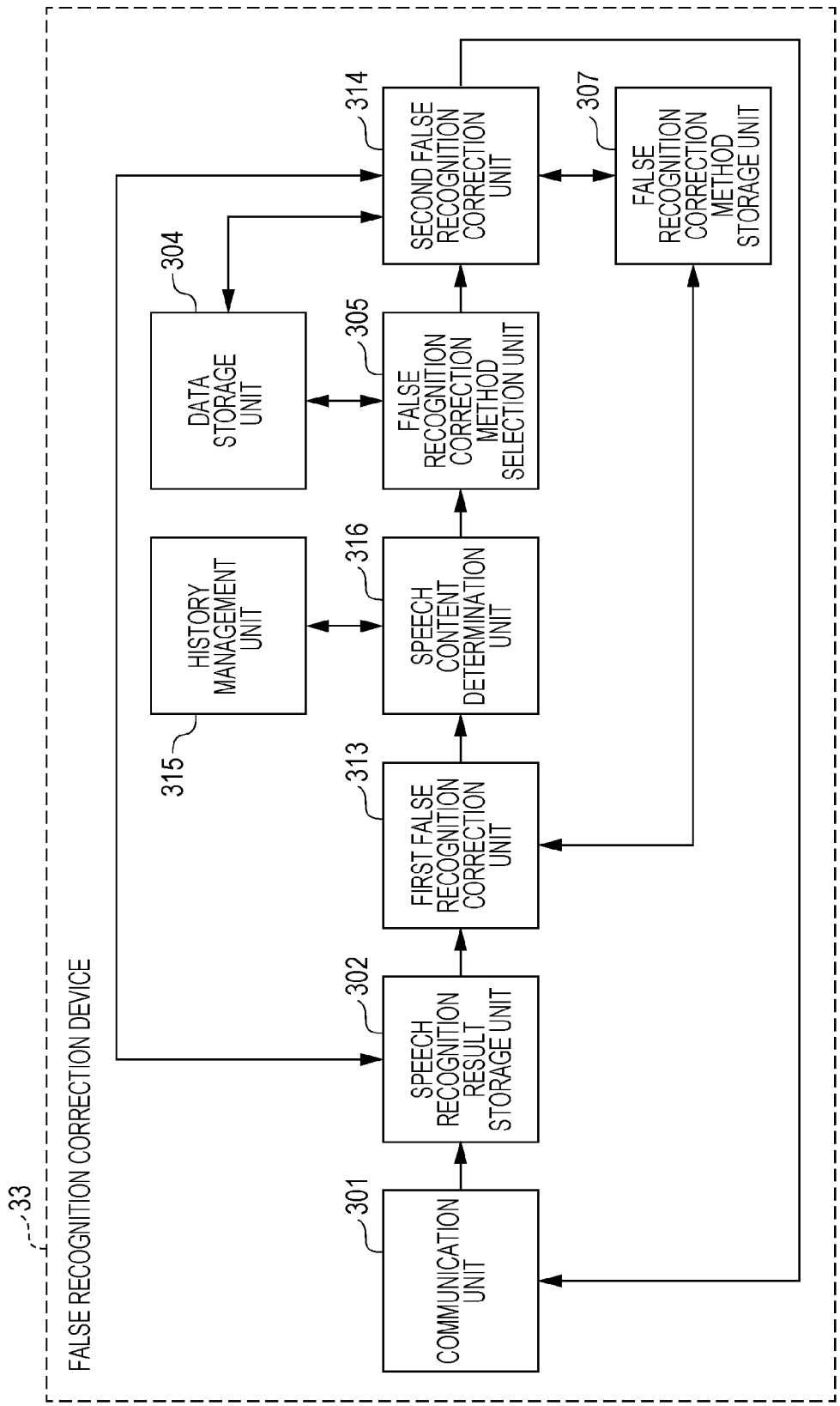
FIG. 22 is a block diagram showing a specific configuration of a false recognition correction device according to a fourth embodiment of the present disclosure.

FIG. 22 is a block diagram showing a specific configuration of a false recognition correction device 33 according to a fourth embodiment of the present disclosure. Compared to the configuration of the false recognition correction device 3 shown in FIG. 4, the false recognition correction device 33 additionally includes a first false recognition correction unit 313 and a history management unit 315, as well as includes a second false recognition correction unit 314 in place of the false recognition correction unit 306.

As shown in FIG. 22, the false recognition correction device 33 includes a communication unit 301, a speech recognition result storage unit 302, a data storage unit 304, a false recognition correction method selection unit 305, a false recognition correction method storage unit 307, the first false recognition correction unit 313, the second false recognition correction unit 314, the history management unit 315, and a speech content determination unit 316. In the fourth embodiment, the same elements as those in the first to third embodiments are given the same reference signs and will not be described.

Information stored in the history management unit 315 and the operation of the speech content determination unit 316 are similar to the information stored in the history management unit 315 and the operation of the speech content determination unit 316 in the third embodiment. The operations of the first false recognition correction unit 313 and second false recognition correction unit 314 are similar to the operations of the first false recognition correction unit 313 and second false recognition correction unit 314 of the second embodiment.

According to this configuration, it is possible to acquire the current situation of the device operated by a speech of the user and to predict the content of the speech of the user on the basis of the acquired current situation of the device. Further, false recognition contained in the recognition result of a speech uttered by the user can be previously corrected using a predetermined preliminary false recognition correction method.

The configurations of a speech input device, a server, and speech interaction devices of the fourth embodiment of the present disclosure are the same as those of the first embodiment and therefore will not be described. The operation of a speech control system of the fourth embodiment of the present disclosure is also the same as that of the first embodiment except for the operation of the false recognition correction device 33 and therefore will not be described.

While, in the first to fourth embodiments, false recognition contained in the recognition result of a speech uttered in Japanese is corrected, the present disclosure is not limited to this configuration. False recognition contained in the recognition result of a speech uttered in a language other than Japanese, such as English or Chinese, may be corrected.

The false recognition correction method, device, and program of the present disclosure can reduce false recognition contained in the speech recognition result and are useful as a false recognition correction method, device, and program that correct false recognition contained in the recognition result of a speech of the user.

What is claimed is:

1. A method, comprising:
    acquiring speech of a user by a microphone;
    transmitting the speech of the user to a server via a communication network;
    determining, by the server, a content of the speech of the user on the basis of text data, including a word string, acquired as a recognition result of the speech;
    transmitting the content of the speech of the user to a false recognition correction device via the communication network;
    determining a speech content ID corresponding to the content of the speech with reference to speech content ID determination data stored in a data storage;
    selecting, by the false recognition correction device accessing the data storage, a correction method suitable for the determined content of the speech from among a plurality of correction methods for correcting false recognition contained in the text data, the selecting based on a correction method ID corresponding to the determined speech content ID; and
    correcting the false recognition contained in the text data using the selected correction method.

2. The method of claim 1,
    wherein the correction methods include at least one of
        (i) a first correction method that converts a word whose false recognition is to be corrected into one of a plurality of words having similar phonemes;
        (ii) a second correction method that converts a word whose false recognition is to be corrected into a word relating to a parameter, of a plurality of words having similar phonemes; and, (iii) a third correction method that converts a word whose false recognition is to be corrected into another word corresponding to a context.

3. The method of claim 1,
wherein the selecting includes selecting the correction method suitable for the determined content of the speech with reference to a table in which first information identifying contents of speeches and second information identifying the correction methods are associated with each other.

4. The method of claim 1, further comprising:
acquiring a current situation of a device operated by a speech of the user,
wherein the determining includes determining the content of the speech on the basis of a prediction based on the acquired current situation of the device.

5. The method of claim 1, further comprising:
determining whether false recognition needs to be corrected, on the basis of the determined content of the speech,
wherein the selecting includes, if it is determined that false recognition needs to be corrected, selecting the correction method suitable for the determined content of the speech from among the correction methods and, if it is determined that false recognition does not need to be corrected, not selecting the correction method suitable for the determined content of the speech from among the correction methods.

6. The method of claim 5,
wherein the determining whether false recognition needs to be corrected includes, if the content of the speech relates to control of a device operated by a speech of the user, determining that false recognition needs to be corrected.

7. The method of claim 5,
wherein the determining whether false recognition needs to be corrected includes, if the content of the speech relates to small talk, determining that false recognition does not need to be corrected.

8. The method of claim 5,
wherein the determining whether false recognition needs to be corrected comprises, if the text data contains a character string that is falsely recognized at a higher frequency than a predetermined value, determining that false recognition needs to be corrected.

9. The method of claim 8,
wherein the character string that is falsely recognized at the higher frequency than the predetermined value is a parameter used to operate a device operated by a speech of the user.

10. The method of claim 9,
wherein the parameter is a number.

11. The method of claim 8,
wherein the character string that is falsely recognized at the higher frequency than the predetermined value is a word string having a phoneme similar to a phoneme of a previously stored word string.

12. The method of claim 1,
wherein the correcting includes correcting the false recognition contained in the text data using at least one of the recognition result and a feature value of the speech in accordance with the selected correction method.

13. The method of claim 1, further comprising:
notifying the user of at least one of the text data acquired as the recognition result and corrected text data.

14. The method of claim 1, further comprising:
preliminarily correcting the false recognition contained in the text data using a predetermined preliminary correction method,
wherein the determining includes determining the content of the speech on the basis of the preliminarily corrected false recognition.

15. The method of claim 14,
wherein the preliminarily correcting includes preliminarily correcting a word whose false recognition contained in the text data occurs at a higher frequency than a predetermined value.

16. A device, comprising:
one or more memories; and
circuitry that, in operation,
    acquires speech of a user by a microphone;
    determines, by a processor, a content of the speech of the user on the basis of text data, including a word string, acquired as a recognition result of the speech;
    determines a speech content ID corresponding to the content of the speech with reference to speech content ID determination data stored in the one or more memories;
    selects, by the processor accessing the one or more memories, a correction method suitable for the determined content of the speech from among a plurality of correction methods for correcting false recognition contained in the text data, the selecting based on a correction method ID corresponding to the determined speech content ID; and
    corrects, by the processor, the false recognition contained in the text data using the selected correction method.

17. A computer-readable non-transitory storage medium storing a program that when executed by a computer, causes the computer to perform a method comprising:
acquiring speech of a user by a microphone;
determining a content of the speech of the user on the basis of text data comprising a word string acquired as a recognition result of the speech;
determining a speech content ID corresponding to the content of the speech with reference to speech content ID determination data stored in a data storage;
selecting, by accessing the data storage, a correction method suitable for the determined content of the speech from among a plurality of correction methods for correcting false recognition contained in the text data, the selecting based on a correction method ID corresponding to the determined speech content ID; and
correcting the false recognition contained in the text data using the selected correction method.

* * * * *